(12) United States Patent
Caretti et al.

(10) Patent No.: US 10,334,570 B2
(45) Date of Patent: Jun. 25, 2019

(54) DEVICE-TO-DEVICE COMMUNICATION MANAGEMENT IN MOBILE COMMUNICATION NETWORKS

(71) Applicant: TELECOM ITALIA S.p.A., Milan (IT)

(72) Inventors: Marco Caretti, Turin (IT); Gian Michele Dell'aera, Turin (IT); Maurizio Fodrini, Turin (IT); Bruno Melis, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 94 days.

(21) Appl. No.: 14/908,958

(22) PCT Filed: Jul. 31, 2013

(86) PCT No.: PCT/EP2013/066070
§ 371 (c)(1),
(2) Date: Jan. 29, 2016

(87) PCT Pub. No.: WO2015/014395
PCT Pub. Date: Feb. 5, 2015

(65) Prior Publication Data
US 2016/0198455 A1    Jul. 7, 2016

(51) Int. Cl.
*H04L 5/00*        (2006.01)
*H04L 12/26*      (2006.01)
(Continued)

(52) U.S. Cl.
CPC ...... *H04W 72/0413* (2013.01); *H04B 17/318* (2015.01); *H04L 5/0055* (2013.01);
(Continued)

(58) Field of Classification Search
CPC ..... H04B 17/318; H04L 5/0055; H04L 43/12; H04W 72/0413; H04W 72/042; H04W 76/023; H04W 76/14
See application file for complete search history.

(56) References Cited

U.S. PATENT DOCUMENTS 8,848,730 B1 *  9/2014  Vleugels ............... H04W 8/005
                                                370/304
9,942,836 B1 *  4/2018  Nagawade .......... H04L 12/6418
(Continued)

FOREIGN PATENT DOCUMENTS

WO    WO 2010/049801 A1    5/2010
WO    WO 2011/036507 A1    3/2011
(Continued)

OTHER PUBLICATIONS

International Search Report dated May 12, 2014, for PCT/EP2013/066070 filed Jul. 31, 2013.
(Continued)

*Primary Examiner* — Asad M Nawaz
*Assistant Examiner* — Kai Chang
(74) *Attorney, Agent, or Firm* — Oblon, McClelland, Maier & Neustadt, L.L.P.

(57) ABSTRACT

A method of operating a mobile communication network including plural radio transceiver stations serving and managing communications between mobile communication devices. The method includes: a first radio transceiver station commanding, to a first mobile communication device, transmission of a probe signal; the first radio transceiver station providing to a second mobile communication device parameters useful to the second mobile communication device for receiving the probe signal; the first radio transceiver station performing a first measuring the probe signal; the first radio transceiver station receiving a second measure of the probe signal, performed by the second
(Continued)

mobile communication device; the first radio transceiver station comparing the first and second measures; the first radio transceiver station commanding a switch of the communication of the first mobile communication device towards the second mobile communication device to a direct device-to-device communication based on a result of the comparing.

33 Claims, 12 Drawing Sheets

(51) Int. Cl.
    *H04W 72/04* (2009.01)
    *H04W 76/14* (2018.01)
    *H04B 17/318* (2015.01)

(52) U.S. Cl.
    CPC ......... *H04W 72/042* (2013.01); *H04W 76/14* (2018.02); *H04L 43/12* (2013.01)

(56) References Cited

U.S. PATENT DOCUMENTS

| | | | | |
|---|---|---|---|---|
| 2008/0069068 A1* | 3/2008 | Dean | ............ | H04W 48/14 370/342 |
| 2010/0091712 A1* | 4/2010 | Lu | ............ | H04W 74/0866 370/328 |
| 2010/0165882 A1* | 7/2010 | Palanki | ............ | H04W 8/005 370/254 |
| 2010/0261469 A1* | 10/2010 | Ribeiro | ............ | H04W 99/00 455/423 |
| 2011/0077017 A1* | 3/2011 | Yu | ............ | H04L 5/0007 455/452.1 |
| 2011/0244899 A1 | 10/2011 | Li et al. | | |
| 2011/0275382 A1 | 11/2011 | Hakola et al. | | |
| 2012/0093098 A1 | 4/2012 | Charbit et al. | | |
| 2012/0184306 A1 | 7/2012 | Zou et al. | | |
| 2012/0258724 A1* | 10/2012 | Kim | ............ | H04W 72/082 455/452.2 |
| 2013/0005377 A1* | 1/2013 | Wang | ............ | H04W 72/0406 455/509 |
| 2013/0028239 A1* | 1/2013 | Dinan | ............ | H04W 72/042 370/336 |
| 2013/0184024 A1* | 7/2013 | Chen | ............ | H04W 76/023 455/509 |
| 2013/0230032 A1 | 9/2013 | Lu et al. | | |
| 2014/0029560 A1 | 1/2014 | Kim | | |
| 2014/0056220 A1* | 2/2014 | Poitau | ............ | H04W 40/246 370/328 |
| 2014/0113674 A1* | 4/2014 | Joseph | ............ | H04W 4/021 455/519 |
| 2014/0129672 A1* | 5/2014 | Singh | ............ | H04L 43/08 709/217 |
| 2014/0148153 A1* | 5/2014 | Gleixner | ............ | H04W 4/005 455/426.1 |
| 2014/0185529 A1* | 7/2014 | Lim | ............ | H04W 8/005 370/328 |
| 2014/0323041 A1* | 10/2014 | Shana'a | ............ | H04B 5/0031 455/41.1 |
| 2015/0092598 A1* | 4/2015 | Kudou | ............ | H04W 48/16 370/254 |
| 2015/0163789 A1* | 6/2015 | Vasudevan | ............ | H04M 15/61 370/259 |
| 2015/0222401 A1* | 8/2015 | Xu | ............ | H04W 76/023 370/329 |
| 2015/0282132 A1* | 10/2015 | Kim | ............ | H04W 8/005 370/329 |
| 2016/0037570 A1* | 2/2016 | Guo | ............ | H04W 76/023 455/404.1 |
| 2016/0135177 A1* | 5/2016 | Ahn | ............ | H04W 48/12 370/329 |
| 2017/0188359 A1* | 6/2017 | Liu | ............ | H04W 72/0446 |

FOREIGN PATENT DOCUMENTS

| | | |
|---|---|---|
| WO | WO 2012/049351 A1 | 4/2012 |
| WO | WO 2012/144839 A2 | 10/2012 |

OTHER PUBLICATIONS

Office Action dated Jul. 10, 2018 in European Patent Application No. 13 747 998.6 , 6 pages.

* cited by examiner

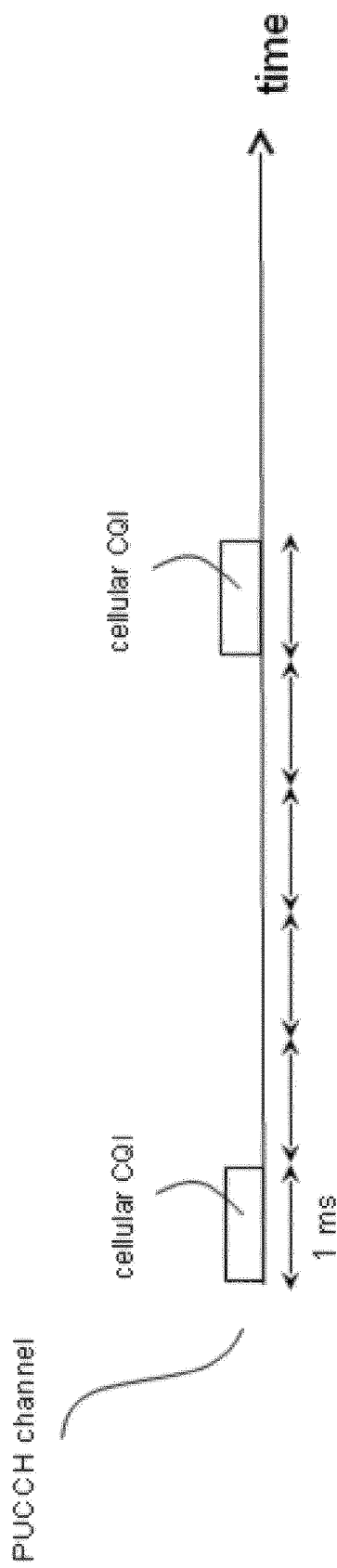
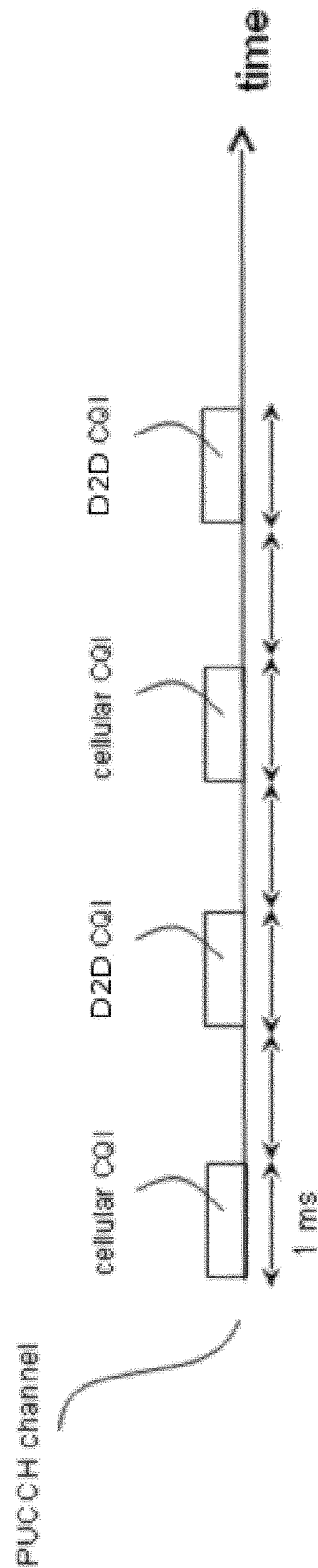
FIG.8A
FIG.8B

DEVICE-TO-DEVICE COMMUNICATION MANAGEMENT IN MOBILE COMMUNICATION NETWORKS

BACKGROUND OF THE INVENTION

Field of the Invention

The present invention refers to communication systems. More particularly, the present invention relates to the field of wireless or mobile telecommunication networks. Even more particularly, the present invention relates to the management of a direct communication (device-to-device communication or D2D communication) among mobile communication devices.

Overview of the Related Art

Generally, in a mobile (cellular) telecommunication network, communications among mobile communication devices (e.g., mobile telephones, smartphones and tablets)—generally referred to as User Equipment, or UE in brief—pass through the telecommunication network: two UE, connected to respective "serving" radio transceivers or "serving" cells of the network (e.g., radio transceivers of a same or different eNodeB—evolved Node B—in the 3GPP Long Term Evolution (LTE)/LTE Advanced (LTE-A) systems), communicate with each other by means of physical communication channel(s) that are set-up and terminated between the radio transceivers and the UE.

As an alternative to such traditional "2-hop" communication, which hereinafter will be also referred to as "cellular communication", recently, UE have been made available that are also capable of communicating directly among them when they happen to be within a relatively short range.

This direct radio communication is commonly referred to as "Device-to-Device", or D2D, communication and is based on D2D communication links directly established by two (or more) UE. D2D communication differs from the traditional cellular communication in that the information is exchanged through physical communication channels that are set-up and terminated between the UE directly, without passing through the network.

Particularly, the D2D communication links may be established by the UE independently from respective serving radio transceivers (or, in principle, even without a connection of the UE with a radio transceiver).

The D2D communication links between UE communicating directly are generally established over frequencies comprised in a communication frequency range used in the cellular communications. The network, i.e. the radio transceiver(s), usually have no control over D2D communications, and are unaware if any such D2D communication is taking place between UE in their geographic area of coverage. Therefore, non-negligible interference may be experienced by UE performing cellular communications in the proximities of UE performing D2D communications and, particularly, when the UE perform cellular communications over the same and/or neighboring frequencies used for D2D communication links; vice-versa, the UE performing D2D communications may experience interference due to nearby UE performing cellular communication over the same or neighboring frequencies.

The mutual interference experienced by UE performing cellular communications and UE performing D2D communications cause an overall degradation of both the cellular and D2D communications.

Some expedients for mitigating the above-mentioned problem have been proposed in the art.

For example, US 2010/0009675 discloses apparatus, methods and computer programs to establish device-to-device communications in a wireless network. A method includes sending an initiation message from a first device to initiate device-to-device communication with a second device; receiving a message indicating a request for setting up radio resources for device-to-device communication; sending a message to the second device, the message including a request to set up resources for device-to-device communication and, in response to establishing device-to-device communication with the second device using the resources, sending an acknowledgment that device-to-device communication is established.

US 2012/0258703 discloses a solution for detection and evaluation of device-to-device (D2) potential prior to the establishment of a cellular connection between communicating mobile devices. Cellular radio access network information of an originating mobile device is obtained from a received session establishment message of session initiation signaling of cellular data communication. The obtained cellular radio access network information of the originating mobile device is compared with acquired cellular radio access network information of a terminating mobile device. Based on the comparison, it is detected whether the proximity between the originating mobile device and the terminating mobile device suffices to allow local cellular device-to-device data communication between the originating mobile device and the terminating mobile device.

WO 2011/047956 discloses methods, apparatuses, and systems for facilitating device-to-device connection establishment. A method may include directing broadcast of an indication of a device-to-device registration area identification in each of one or more cells forming a device-to-device registration area identified by the device-to-device registration area identification. The method may further include directing receipt of a device-to-device registration request originated by a first terminal apparatus in response to the broadcast indication. The first terminal apparatus may be located within the registration area. The method may additionally include registering the first terminal apparatus based at least in part upon the device-to-device registration request. Corresponding apparatuses and systems are also provided.

WO 2012/114161 discloses devices and methods for determining the proximity of client nodes within a wireless-enabled communication environment. A first client node comprises a database containing identification data associated with a plurality of wireless network access nodes and fingerprint data associated with the client node and a plurality of second client nodes. As the fingerprint information is updated, it is processed by the first client node to identify second client nodes that have matching, or similar, fingerprint information. Those that do are determined to be within a viable device-to-device (D2D) communication range.

WO 2010/049801 discloses an apparatus, system and method to dynamically manage an allocation of communication resources for direct device-to-device communications between a plurality of wireless communication devices in a wireless communication system. In one embodiment, the apparatus includes a communication resource allocator configured to: select a master communication device of a plurality of wireless communication devices that form a device-to-device group, provide an allocation of communication resources for device-to-device group that facilitate direct device-to-device communications therebetween. The apparatus also includes a message generator configured to assemble messages that include the allocation of the communication resources.

WO 2012/015698 discloses techniques for supporting peer-to-peer (P2P) communication in a wide area network (WAN). In an aspect, interference coordination between P2P devices engaged in P2P communication and WAN devices engaged in WAN communication may be performed based on a network-controlled architecture. For the network-controlled architecture, P2P devices may detect other P2P devices and/or WAN devices and may send measurements (e.g., for pathloss, interference, etc.) for the detected devices to the WAN (e.g., serving base stations). The WAN may perform resource partitioning and/or association for the P2P devices based on the measurements. Association may include selection of P2P communication or WAN communication for a given P2P device. Resource partitioning may include allocation of resources to a group of P2P devices for P2P communication. The WAN may send the results of association and/or resource partitioning to the P2P devices, which may communicate in accordance with the association and/or resource partitioning results.

WO 2011/036507 provides methods and apparatus, including computer program products, for selecting between a device-to-device link and a 2-hop cellular link. In one aspect there is provided a method. The method may include monitoring, at a user equipment, a paging signal, the paging signal including a random access preamble index assigned to another user equipment. The user equipment may be configured to use the random access preamble index assigned to the another user equipment, and receive a signal comprising a random access preamble. The user equipment may measure the received signal to generate an indication representative of a quality of the received signal. Based on the indication rather than a dedicated probe, a determination may be made regarding whether to establish a first connection directly to the another user equipment. Related apparatus, systems, methods, and articles are also described.

SUMMARY OF THE INVENTION

The Applicant has found that the known solutions mentioned above fail in providing a satisfactory management of D2D communications, because the telecommunication network is not able to properly supervise the whole execution thereof and to control the amount of data exchanged during the D2D communications.

Therefore, the Applicant has coped with the problem of devising a system and method adapted to bring the D2D communications as much as possible under the control of the mobile communication network, when the UE performing D2D communications are located in an area of coverage of the mobile communication network.

Thanks to the D2D communications control according to embodiments of the present invention, the mobile communication network may directly control the transmission resources (transmission power, transmission bandwidth, etc.) for UE in D2D communication along with the transmission resources for UE in cellular communication. Therefore, the mobile communication network may efficiently allocate radio resources in order to reduce the interferences between D2D communications and cellular communications and in order to optimize the power spectral efficiency (i.e., data rate that can be transmitted over a given bandwidth in a specific communication system) of the radio resources.

Particularly, one aspect of the present invention proposes a method of operating a mobile communication network. The mobile communication network comprises a plurality of radio transceiver stations serving mobile communication devices, the mobile communication network managing communications between mobile communication devices. The method comprises the following steps. Having a first radio transceiver station of said plurality command, to a first mobile communication device served by it, the transmission of a probe signal. Having the first radio transceiver station provide to a second mobile communication device parameters useful to the second mobile communication device for receiving the probe signal transmitted by the first mobile communication device. Having the first radio transceiver station perform a first measure of the probe signal transmitted by the first mobile communication device. Having the first radio transceiver station receive a second measure of the probe signal transmitted by the first mobile communication device, the second measurement being performed by the second mobile communication device. Having the first radio transceiver station compare the first measure and the second measure. Having the first radio transceiver station command a switch of the communication of the first mobile communication device towards the second mobile communication device to a direct device-to-device communication based on a result of said compare.

Preferred features of the present invention are set forth in the dependent claims.

In one embodiment of the present invention, the first measure and the second measure of the probe signal are a measure of the strength of said probe signal, and the first radio transceiver station command a switch of the communication of the first mobile communication device towards the second mobile communication device in case said compare reveals that such direct device-to-device communication of the first mobile communication device towards the second mobile communication device results in a reduction of transmit power for the first mobile communication device compared to a communication passing through the radio transceiver stations of the mobile communication network.

In one embodiment of the present invention, the method further comprises the following steps. Having a second radio transceiver station of said plurality serving the second mobile communication device command, to the second mobile communication device, the transmission of the probe signal. Having the second radio transceiver station provide to the first mobile communication device parameters useful to the first mobile communication device for receiving the probe signal transmitted by the second mobile communication device. Having the second radio transceiver station perform a third measure of the probe signal transmitted by the second mobile communication device. Having the second radio transceiver station receive a fourth measure of the probe signal transmitted by the second mobile communication device, the fourth measure being performed by the first mobile communication device. Having the second radio transceiver station compare the third measure and the fourth measure. Having the second radio transceiver station command a switch of the communication of the second mobile communication device towards the first mobile communication device to a direct device-to-device communication based on a result of said compare.

In one embodiment of the present invention, the third measure and the fourth measure of the probe signal are a measure of the strength of said probe signal, and the second radio transceiver station command a switch of the communication of the second mobile communication device towards the second mobile communication device in case said compare reveals that such direct device-to-device communication of the second mobile communication device towards the first mobile communication device results in a reduction of transmit power for the second mobile communication device compared to a communication passing through the radio transceiver stations of the mobile communication network.

In a further embodiment of the present invention, having a first radio transceiver station command, to the first mobile communication device served by it, the transmission of a probe signal and having the second radio transceiver station serving the second mobile communication device command, to the second mobile communication device, the transmission of the probe signal comprise having the first and second radio transceiver stations command to transmit to the first and second mobile communication devices, respectively, said probe signal over a network physical random access channel of the mobile communication network, preferably the probe signal is a signal of request of access to the mobile communication network request signal, even more preferably the probe signal is transmitted over the PRACH.

In one embodiment of the present invention, said compare the first measure and the second measure comprises comparing a first ratio of the second measure to the first measure to a first threshold, and said compare the third measure and the fourth measure comprise comparing a second ratio of the fourth measure to the third measure to the first threshold. In case said first ratio exceeds said first threshold, having the first radio transceiver station command the switch of the communication of the first mobile communication device towards the second mobile communication device to the direct device-to-device communication, and in case said second ratio exceeds said first threshold, having the second radio transceiver station command the switch of the communication of the second mobile communication device towards the first mobile communication device to a direct device-to-device communication.

In a further embodiment of the present invention, during said direct device-to-device communication, having the mobile communication network command to at least one among the first mobile communication device and the second mobile communication device to send data packets directly to the second or first mobile communication device over a physical uplink shared channel, preferably the PUSCH.

In one embodiment of the present invention, the method further comprises, during said direct device-to-device communication, having the first and the second radio transceiver stations of the mobile communication network receive send acknowledgements of successful/unsuccessful receipt messages sent from the first and the second mobile communication devices, respectively, for data packets received directly from the second and the first mobile communication devices, respectively, and having the mobile communication network forward the acknowledgements of successful/unsuccessful receipt messages to the second and to the first mobile communication devices, respectively.

In a further embodiment according to the present invention, said receive acknowledgements of successful/unsuccessful receipt messages comprises having the first and the second radio transceiver stations receive the acknowledgements of successful/unsuccessful receipt messages over a physical uplink control channel, preferably the PUCCH, and said having the mobile communication network forward the acknowledgements of successful/unsuccessful receipt messages comprises having the mobile communication network transmit the acknowledgements of successful/unsuccessful receipt messages over a receipts-dedicated downlink physical channel, preferably the PHICH.

In one embodiment of the present invention, the method further comprises, during said direct device-to-device communication having the first radio transceiver station send to the first mobile communication device and forward to the second mobile communication device a first downlink control information message, preferably DCI, the first downlink control information message comprising a first indication of resources allocated to the first mobile communication device for sending data packets over the physical uplink shared channel to the second mobile communication device, and having the second radio transceiver station send to the second mobile communication device and forward to the first mobile communication device a second downlink control information message, the second downlink control information message comprising a second indication of resources allocated to the second mobile communication device for sending data packets over the physical uplink shared channel to the first mobile communication device.

In a further embodiment of the present invention, the first downlink control information message further comprises a first further indication of resources allocated to the first mobile communication device for sending acknowledgements of successful/unsuccessful receipt messages and/or control packets over the physical uplink control channel to the first transceiver station, and the second downlink control information message further comprises a second further indication of resources allocated to the second mobile communication device for sending acknowledgements of successful/unsuccessful receipt messages and/or control packets over the physical uplink control channel to the second transceiver station.

In one embodiment of the present invention, the method further comprises, during said direct device-to-device communication, having the mobile communication network exclude predetermined transmission intervals of a transmission time window from the resources allocated to the first and second mobile communication devices for their transmissions over the data uplink physical channel and over the physical uplink control channel.

In a further embodiment of the present invention, the method further comprises, during said direct device-to-device communication, having the mobile communication network allocate resources to the first and/or the second mobile communication devices in predetermined transmission intervals of a transmission time window, said predetermined transmission intervals following a transmission interval in which the first and/or the second mobile communication device received the first or the second downlink control information message, respectively.

In one embodiment of the present invention, the first downlink control information message further comprises a first adjustment indication, the second downlink control information message further comprises a second adjustment indication, and the method further comprises having the first mobile communication device adjust, according to said first adjustment indication, a first uplink transmission power used for sending the data packets and/or the acknowledgements of successful/unsuccessful receipt messages and the control packets, and having the second mobile communication device adjust, according to said second adjustment indication, a second uplink transmission power used for sending the data packets and/or the acknowledgements of successful/unsuccessful receipt messages and the control packets.

In a further embodiment of the present invention, during said direct device-to-device communication, the method further comprises the following steps. Having the second transceiver station command to the second mobile communication device to send a first demodulation reference signal, preferably the DMRS, to the first mobile communication device over the physical uplink shared channel. Having the first radio transceiver station receive from the first mobile communication device a first direct channel quality indicator, the first direct channel quality indicator being computed and sent by the first mobile communication device based on the received first demodulation reference signal. Having the first transceiver station command to the first mobile communication device to send a second demodulation reference signal to the second mobile communication device over the physical uplink shared channel. Having the second radio transceiver station receive from the second mobile communication device a second direct channel quality indicator, the second direct channel quality indicator being computed and sent by the second mobile communication device based on the second demodulation reference signal.

In one embodiment of the present invention, during said direct device-to-device communication, the method further comprises the following steps. Having the mobile communication network determine a first modulation and coding scheme, preferably the MCS, based on the first direct channel quality indicator for the sending data packets over the physical uplink data channel from the first mobile communication device towards the second mobile communication device. Having the mobile communication network provide said first modulation and coding scheme to the first mobile communication device and to the second mobile communication device. Having the mobile communication network determine a second modulation and coding scheme based on the second direct channel quality indicator for the sending data packets over the physical uplink data channel from the second mobile communication device towards the first mobile communication device. Having the mobile communication network provide said second modulation and coding scheme to the second mobile communication device and to the first mobile communication device.

In a further embodiment of the present invention, during said direct device-to-device communication, the method further comprises the following steps. Having the first radio transceiver station send a first downlink reference signal, preferably the CRS, to the first mobile communication device over the physical downlink control channel, preferably the PDCCH. Having the first radio transceiver station command the first mobile communication device to send the first direct channel quality indicator and a first cellular channel quality indicator alternately with a predetermined periodicity, the first cellular channel quality indicator being computed and sent by the first mobile communication device on the basis of the first downlink reference signal. Having the second radio transceiver station send a second downlink reference signal to the second mobile communication device over the physical downlink control channel. Having the second radio transceiver station command to the second mobile communication device to send the second direct channel quality indicator and a second cellular channel quality indicator alternately with the predetermined periodicity, the second cellular channel quality indicator being computed and sent by the second mobile communication device on the basis of the second downlink reference signal.

In one embodiment of the present invention, during said direct device-to-device communication, the method further comprises the following steps. Having the mobile communication network compare the first direct channel quality indicator with the first cellular channel quality indicator. Moreover, in case said compare reveals that the first direct channel quality indicator is lower than the first cellular channel quality indicator having the mobile communication network trigger the transmission of a respective reference signal, preferably the SRS or the DMRS, by the first and by the second mobile communication device, having the mobile communication network measure the transmitted reference signals, having the first radio transceiver station command a switch of the communication of the first mobile communication device towards the second mobile communication device to the communication passing through the radio transceiver stations of the mobile communication network on the basis of said measurement, having the mobile communication network compare the second direct channel quality indicator with the second cellular channel quality indicator. In case said compare reveals that the first direct channel quality indicator is lower than the first cellular channel quality indicator having the mobile communication network trigger the transmission of a respective reference signal, preferably the SRS or the DMRS, by the first and by the second mobile communication device, having the mobile communication network measure the transmitted reference signals, and having the second radio transceiver station command a switch of the communication of the second mobile communication device towards the first mobile communication device to the communication passing through the radio transceiver stations of the mobile communication network on the basis of said measurement.

In a further embodiment of the present invention, the method further comprises, during said direct device-to-device communication, periodically reiterating the preceding steps of the method, and having the first radio transceiver station command a switch of the communication of the first mobile communication device towards the second mobile communication device to the communication passing through the radio transceiver stations of the mobile communication network in case said compare reveals that such direct device-to-device communication of the first mobile communication device towards the second mobile communication device requires a higher transmit power for the first mobile communication device compared to the communication passing through the radio transceiver stations of the mobile communication network.

In one embodiment of the present invention, the method further comprises, during said direct device-to-device communication, periodically reiterating the preceding steps of the method, and having the second radio transceiver station command a switch of the communication of the second mobile communication device towards the first mobile communication device to the communication passing through the radio transceiver stations of the mobile communication network in case said compare reveals that such direct device-to-device communication of the second mobile communication device towards the first mobile communication device requires higher transmit power for the second mobile communication device than the communication passing through the radio transceiver stations of the mobile communication network.

In a further embodiment of the present invention, said compare the first measure and the second measure comprises comparing a first ratio of the second measure to the first measure to a second threshold lower than said first threshold, and said compare the third measure and the fourth measure comprise comparing a second ratio of the fourth measure to the third measure to the second threshold. In case said first ratio is lower than said second threshold, having the first radio transceiver station command the switch of the communication of the first mobile communication device towards the second mobile communication device to the communication passing through the radio transceiver stations of the mobile communication network. In case said second ratio is lower than said second threshold, having the second radio transceiver station command the switch of the communication of the second mobile communication device towards the first mobile communication device to the communication passing through the radio transceiver stations of the mobile communication network.

Another aspect of the present invention proposes a method of operating a mobile communication network. The mobile communication network comprises a plurality of radio transceiver stations serving mobile communication devices, the mobile communication network managing communications between mobile communication devices. The method comprises the following steps. Having a radio transceiver station of said plurality command, to a first mobile communication device, the transmission of a probe signal. Having the radio transceiver station provide to a second mobile communication device parameters useful to the second mobile communication device for receiving the probe signal transmitted by the first mobile communication device. Having the radio transceiver station perform a first measure of the probe signal transmitted by the first mobile communication device. Having the radio transceiver station receive a second measure of the probe signal transmitted by the first mobile communication device, the second measure being performed by the second mobile communication device. Having the radio transceiver station compare the first measure and the second measure. Having the radio transceiver station command, to the second mobile communication device, the transmission of the probe signal. Having the radio transceiver station provide to the first mobile communication device parameters useful to the first mobile communication device for receiving the probe signal transmitted by the second mobile communication device. Having the radio transceiver station perform a third measure of the probe signal transmitted by the second mobile communication device. Having the radio transceiver station receive a fourth measure of the probe signal transmitted by the second mobile communication device, the fourth measure being performed by the first mobile communication device. Having the radio transceiver station compare the third measure and the fourth measure. Eventually, based on results of said compare the first measure with the second measure and of said compare the third measure with the fourth measure, the method comprises one of the following steps. Having the radio transceiver station command a switch of the communication of the first mobile communication device towards the second mobile communication device and the communication of the second mobile communication device towards the first mobile communication device from a communication passing through the radio transceiver stations of the mobile communication network to a direct device-to-device communication or vice-versa. Having the radio transceiver station command a switch of the communication of the first mobile communication device towards the second mobile communication device or a switch of the communication of the second mobile communication device towards the first mobile communication device from the communication passing through the radio transceiver stations of the mobile communication network to the direct device-to-device communication or vice-versa. Having the radio transceiver station maintain the communication of the first mobile communication device towards the second mobile communication device and the communication of the second mobile communication device towards the first mobile communication device as the communication passing through the radio transceiver stations of the mobile communication network, or as direct device-to-device communication.

Another aspect of the present invention proposes a mobile communication network adapted to manage communications between mobile communication devices, the mobile communication network comprising a plurality of radio transceiver stations and being adapted to implement the method above described.

Another aspect of the present invention proposes a method of operating a mobile communication device. The mobile device is adapted to communicate over a mobile communication network that comprises a plurality of radio transceiver stations for serving mobile communication devices. The method comprises the following steps. Having the mobile communication device transmit a probe signal, in response to a command from a serving radio transceiver station of said plurality that is serving the mobile communication device. Having the mobile communication device receive parameters useful to the mobile communication device for receiving a probe signal transmitted by a further mobile communication device, the parameters being provided by the serving radio transceiver station. Having the mobile communication device perform a measure of a strength of a probe signal transmitted by the further mobile communication device. Having the mobile communication device provide to the serving radio transceiver station the measure of the probe signal transmitted by the further mobile communication device. Having the mobile communication device switch the communication towards the further mobile communication device or/and from the further mobile communication device to a direct device-to-device communication in response to a command from the serving radio transceiver station, or having the mobile communication device switch the communication towards the further mobile communication device to a communication passing through the radio transceiver stations of the mobile communication network in response to a command from the radio transceiver station.

In one embodiment of the present invention, the measure of the probe signal is a measure of the strength of said probe signal.

In one embodiment of the present invention, during said direct device-to-device communication, the method comprises having the mobile communication device send data packets directly to the further mobile communication device over a physical uplink shared channel, preferably the PUSCH.

In a further embodiment of the present invention, the method further comprises, during said direct device-to-device communication, having the mobile communication device send acknowledgements of successful/unsuccessful receipt messages, for data packets received directly from the further mobile communication devices, to the serving radio transceiver station of the mobile communication network, and having the mobile communication device receive the acknowledgements of successful/unsuccessful receipt messages forwarded by the mobile communication network for data packets sent from the mobile communication devices to the further mobile communication device.

In one embodiment of the present invention, said send acknowledgements of successful/unsuccessful receipt messages comprises having the mobile communication device transmit the acknowledgements of successful/unsuccessful receipt messages to the mobile communication network over a physical uplink control channel, preferably the PUCCH, and said having the mobile communication device receive the acknowledgements of successful/unsuccessful receipt messages comprises having the mobile communication device receive the acknowledgements of successful/unsuccessful receipt messages over a receipts-dedicated downlink physical channel, preferably the PHICH.

In a further embodiment of the present invention said send acknowledgements of successful/unsuccessful receipt messages further comprises having the mobile communication devices transmit the acknowledgements of successful/unsuccessful receipt messages to the further mobile communication device, over the data uplink physical channel (PUSCH).

In one embodiment of the present invention, during said direct device-to-device communication, the method further comprises the following steps. Having the mobile communication device receive a demodulation reference signal, preferably the DMRS, from the further mobile communication device over the physical uplink shared channel. Having the mobile communication device determine a direct channel quality indicator based on the received demodulation reference signal. Having the mobile communication device send the direct channel quality indicator to the serving radio transceiver station.

In a further embodiment of the present invention, during said direct device-to-device communication, the method further comprises the following steps. Having the mobile communication device receive from the serving radio transceiver station a downlink reference signal, preferably the CRS, over the physical downlink control channel, preferably the PDCCH. Having the mobile communication device determine a cellular channel quality indicator based on the received downlink reference signal. Having the mobile communication device send to the serving radio transceiver station the direct channel quality indicator and the cellular channel quality indicator alternately with a predetermined periodicity.

Another aspect of the present invention proposes a mobile communication device capable of performing direct device-to-device communication with at least a further mobile communication device. The mobile communication device is adapted to implement the method above described.

In one embodiment of the present invention, the mobile communication device comprises an uplink transmitter having a first combining element and a second combining element. The first combining element is adapted to combine control information with a first power scaling factor and the second combining element is adapted to combine data information of the direct device-to-device communication with a second power scaling factor, respectively.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein:

FIG. 8A shows a CQI reporting for UE when involved in a cellular communication and configured with a periodic reporting rate of 5 ms;

FIG. 8B shows the CQI reporting for UE when involved in a D2D communication and configured with a periodic reporting rate of 2 ms according to an embodiment of the present invention;

DETAILED DESCRIPTION OF THE INVENTION

In the following disclosure, reference to Long Term Evolution (LTE)/LTE Advanced (LTE-A) systems is made, nonetheless the same concepts may be applied to other mobile communication systems as well.

Figure 1:
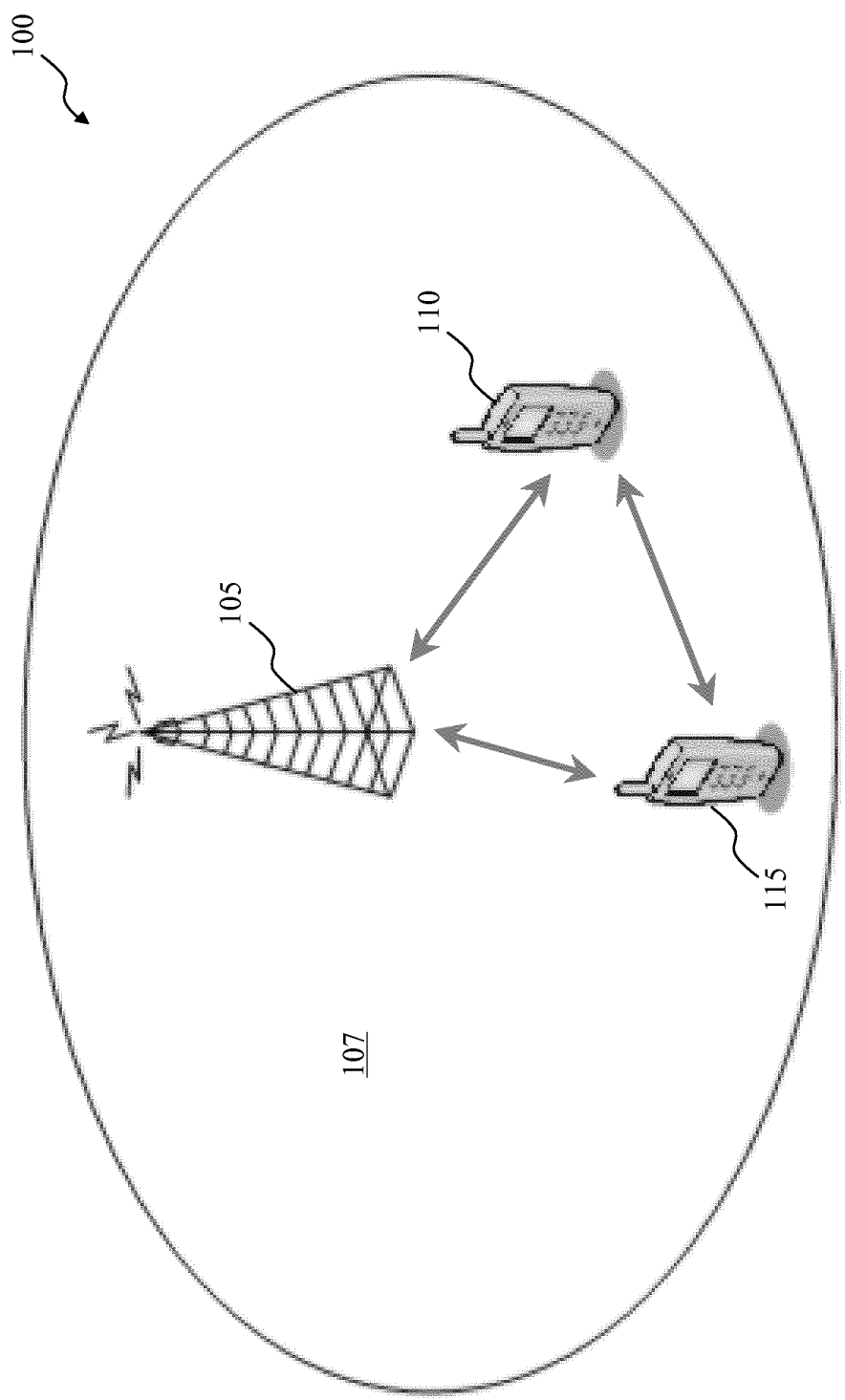
FIG. 1 is a schematic view of portion of a mobile communication network comprising an eNodeB to which two UE are connected according to an embodiment of the present invention.

With reference to the drawings, FIG. 1 is a schematic view of portion of a mobile communication network 100, for example an LTE/LTE-A mobile communication network, comprising a radio access network element such as for example an evolved Node B, or eNodeB 105. Two UE 110 and 115 are located in a geographic area 107 of coverage of (i.e., served by) the eNodeB 105.

The structure of the eNodeB 105 is known per se. An eNodeB comprises one or more radio transceivers (typically three, not shown in the drawing), each of which is adapted to establish and to manage data exchange through physical communication channel(s) between the UE 110 and 115 and the eNodeB 105 in a respective portion (also referred to as a "cell") of the geographic area 107 served by the eNodeB 105. The eNodeB 105 comprises also a baseband unit adapted to manage the data exchanged by the (e.g., three) radio transceivers of the eNodeB 105. The radio transceivers controlled by the same eNodeB can be co-located as shown in FIG. 1, or they can be distributed in different locations and connected to a central unit typically via an optical fiber connection and a proprietary communication protocol. In the following, the terms "radio transceiver" and the associated "cell" will be considered as interchangeable.

It is assumed that the UE 110 and 115 are D2D-capable, i.e. they are capable of performing a "Device to Device" or D2D communication, wherein the UE 110 and 115 communicate through physical (communication) channel(s) that are set-up and terminated between the UE 110 and 115 directly, in addition to being capable of performing a typical 2-hop, cellular communication, wherein the UE 110 and 115 communicate with each other by means of physical (communication) channel(s) that are set-up and terminated between the eNodeB 105 and each one of the UE 110 and 115.

Let it be assumed that the UE 110 and 115 are connected to the mobile communication network 100 (i.e., the UE 110 and 115 are in "connected mode") and in cellular communication with one another (i.e., the data from/to the UE 110 and 115 pass through the eNodeB 105).

In the solution according to an embodiment of the present invention, the mobile communication network 100 is adapted to switch communications between UE 110 and 115 from cellular communications to a D2D communications and, vice-versa, from D2D communications to cellular communications as a function of radio parameters of the UE 110 and 115.

Generally, the mobile communication network 100 according to the present invention checks, e.g. once or possibly from time to time, e.g. periodically, the possibility that at least one of the two UE 110 or 115 involved in cellular communication can communicated directly with the other UE 115 or 110 by performing a D2D communication. Such a check may be for example performed by the mobile communication network 100 by implementing a proximity detection procedure, also referred to as discovery procedure in the following; for example, the discovery procedure may be implemented directly at the eNodeB 105.

Since the UE 110 and 115 are in connected mode, the mobile communication network 100 is aware that the UE 110 and 115 are in the area of coverage of the mobile communication network 100, particularly in the area of coverage 107 of the eNodeB 105 serving the two UE. Thus, the mobile communication network 100 can autonomously start the discovery procedure.

In an embodiment of the present invention, the discovery procedure is performed by exploiting, as probe signals, power/communication management information exchanged between each of the UE 110 and 115 and the eNodeB 105. For example, a preamble signal transmitted on PRACH (Physical Random Access CHannel) as defined in the LTE/LTE-A standard—referred to as PRACH preamble in the following—may be advantageously used as the probe signal.

According to the 3GPP LTE/LTE-A standard, the PRACH preamble is used for resource assignment. Transmissions of data by the UE 110 and 115 on the PUSCH (Physical Uplink Shared CHannel) must be scheduled by the eNodeB 105. Any of the UE 110 or 115, for connecting to the eNodeB 105 and communicating, has to perform a RACH procedure first, in which the UE 110 or 115 sends to the eNodeB 105 the PRACH preamble and, in response, the eNodeB 105 assigns (through the PDCCH—Physical Downlink Control CHannel) available resources of the PUSCH for the communication thereof.

The PRACH is periodically allocated over a reserved time/frequency slot that is reserved within the PUSCH allocation region. For example, with reference to the LTE frame structure type 1 (for FDD—Frequency Division Duplexing), only one PRACH slot can be configured in each subframe (i.e., a time interval 1 ms long corresponding to a TTI, Time Transmission Interval, within a frame of 10 ms). The duration of a PRACH slot can be 1, 2 or 3 ms depending on the selected format. The periodicity of the PRACH slot can be scaled from 1 ms to 20 ms depending on the expected PRACH load i.e., frequency of the transmissions of the PRACH preamble from all the UE under the same cell). The bandwidth of the PRACH slot along the frequency axis is set equal to 6 (physical) Resource Blocks (RBs), which corresponds to 12 x·6=72 subcarriers spaced of 15 kHz from each other.

Figure 2:
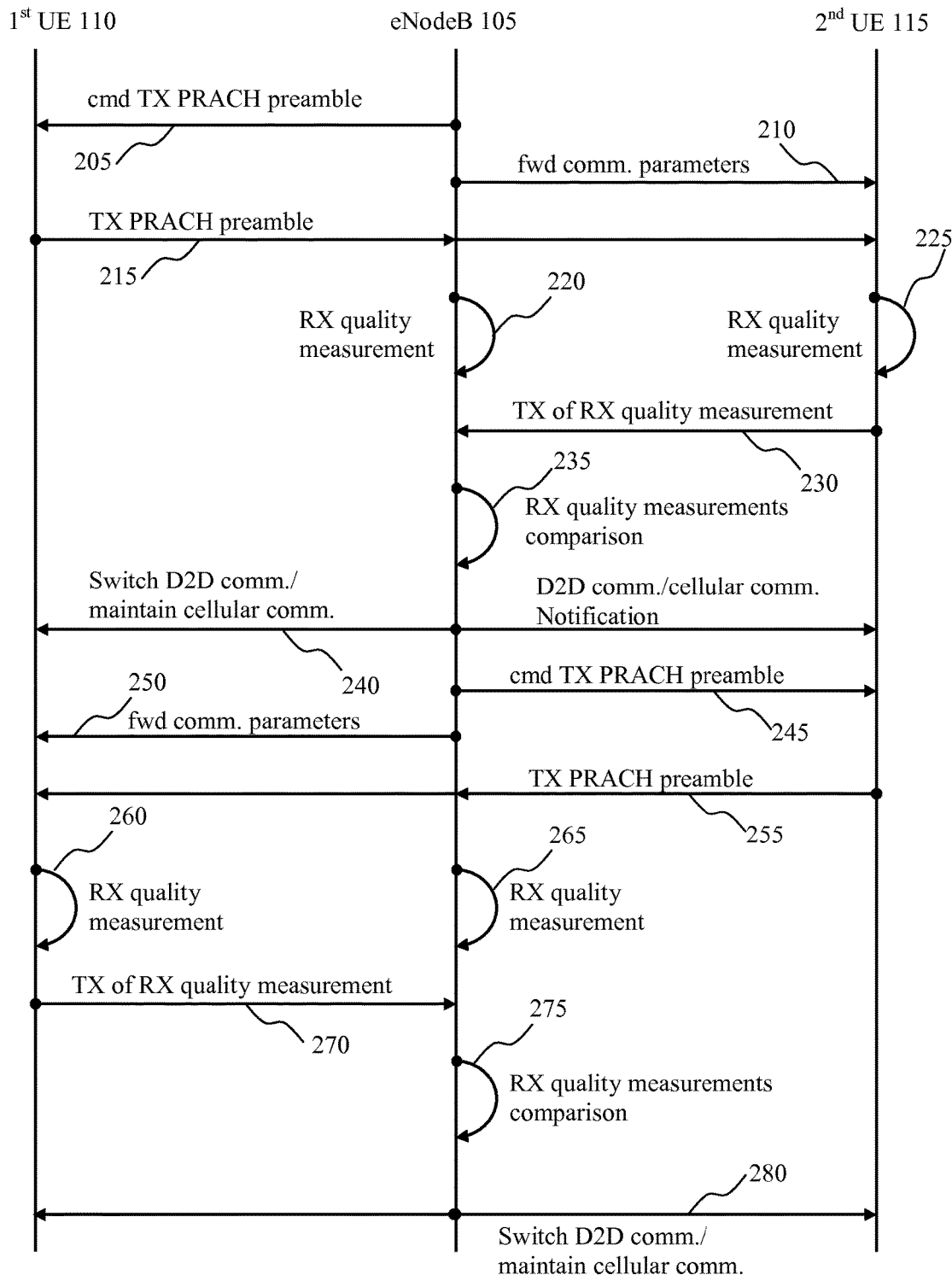
FIG. 2 is a schematic sequence diagram of a discovery procedure according to an embodiment of the present invention, referred to the scenario of FIG. 1.

A discovery procedure according to an embodiment of the present invention will be now described by referring to FIG. 2, which is a schematic actions sequence diagram of a discovery procedure according to an embodiment according to the present invention. The discovery procedure comprises the following phases or steps.

The cell of the eNodeB 105 serving a first one of the UE 110 and 115 that are currently communicating in cellular communication mode, e.g. the UE 110 (hereinafter referred to as "first UE 110") commands to the served first UE 110 the transmission of a PRACH preamble (first phase 205 of the discovery procedure). The cell of the eNodeB 105 serving a second one of the UE 110 and 115—in this example the UE 115, referred to as "second UE 115" in the following—signals to the served UE 115 communication parameters that are necessary for the detection of the PRACH preamble (second phase 210 of the discovery procedure). The PRACH preamble is transmitted by the first UE 110 (third phase 215 of the discovery procedure). Examples of such communication parameters are: preamble sequence index, and PRACH time/frequency slot index. The cell serving the second UE 115 can be the same cell serving the first UE 110, or another one of the cells of the eNodeB 105.

The second UE 115 and the radio transceiver serving the first UE 110 both measure the quality of the received PRACH preamble, in such a way to obtain an estimation of signal attenuation experienced during transmission over a radio propagation channel (fourth and fifth phases 220 and 225 of the discovery procedure). Preferably, although not limitatively, the measure of the quality of the received PRACH preamble is carried out in terms of received power level (i.e., a power intensity of the PRACH preamble transmitted by the first UE 110 and sensed by its serving radio transceiver and by the second UE 115).

Once the measurement has been performed, the second UE 115 reports such measurement to the cell serving the first UE 110 (sixth phase 230 of the discovery procedure).

In the case the UE 110 and 115 are served by different cells of the eNodeB 105, the second UE 115 reports the measurement to its serving cell, the latter then forwards the measurement to the cell which is serving the first UE 110.

The cell serving the first UE 110 compares (e.g., by means of a evaluation function implemented therein) the measurement performed by itself with the measurement reported by the second UE 115 (seventh phase 235 of the discovery procedure) and, based on the comparison, determines whether a D2D communication can be conveniently set up for the first UE 110 towards the second UE 115 (eighth phase 240 of the discovery procedure as described in detail later on) and the switching to D2D communication (or the continuation of cellular communication) is notified to both UE 110 and 115 (eighth phase 240 of the discovery procedure).

Advantageously, the above-described phases of the discovery procedure are then repeated exchanging the roles of the UE 110 and 115. Thus, the second UE 115 is instructed by its serving cell to transmit a PRACH preamble (ninth phase 245 of the discovery procedure), while cell serving the first UE 110 signals thereto the communication parameters (tenth phase 250 of the discovery procedure). In this way the PRACH preamble transmitted by the second UE 115 (eleventh phase 255 of the discovery procedure) can be identified by the first UE 110 and the received power level of the PRACH preamble transmitted by the second UE 115 can be measured by the first UE 110 in addition to the cell serving the second UE 115 (twelfth and thirteenth phases 260 and 265 of the discovery procedure). Similarly as described above, the first UE 110 provides the measurement to the cell serving the second UE 115 (fourteenth phase 270 of the discovery procedure), which compares the measurement made by itself and reported by the first UE 110 (fifteenth phase 275 of the discovery procedure), and, based on the comparison, assesses whether a D2D communication can be conveniently set up for the second UE 115 towards the first UE 110 and the switching to D2D communication (or the continuation of cellular communication) is notified to both UE 110 and 115 (sixteenth phase 280 of the discovery procedure).

Thanks to the discovery procedure according to the exemplary embodiment of the present invention, the eNodeB 105 can switch to a D2D communication the initiating or ongoing cellular communication from the first UE 110 towards the second UE 115 and/or the initiating or ongoing cellular communication from the second UE 115 towards the first UE 110, independently from each other.

Advantageously, the eNodeB 105 may be configured to allow establishing a symmetric D2D communication or an asymmetrical D2D communication (or single-UE D2D communication) based on a convenience in establishing D2D communication links (as described in the following) compared to cellular communication links. The term symmetric D2D communication means that both the UE 110 and 115 are in D2D communication with each other. Instead, the term asymmetrical D2D communication means that the eNodeB 105 enables a switching from cellular communication to D2D communication for only one of the UE 110 or 115, while the eNodeB 105 maintains the cellular communication for the other UE 115 or 110, respectively. For example, if, through the discovery procedure, only the D2D communication from the first UE 110 towards the second UE 115 is determined to be more convenient than the corresponding cellular communication (whereas for the second UE 115 the cellular communication remains more convenient than the D2D communication), the cellular communication from the first UE 110 towards the second UE 115 is switched to a D2D communication, while the cellular communication from the second UE 115 towards the first UE 110 is maintained.

An advantage in using the PRACH, particularly the PRACH preamble, in the discovery procedure is that the UE 110 and 115 involved in the discovery procedure are able to acquire from the (respective serving cell of the) eNodeB 105 a Timing Advance (TA) information, for the PUSCH, that will be expediently used for the D2D communication. As known, the eNodeB 105 can estimate the transmission timing of a UE 110 and 115 based on the PRACH preamble received therefrom, and the eNodeB then transmits the estimated TA to the UE 110 or 115 in a Random Access Response which consists of timing advance command, on which basis the UE 110 or 115 can thus adjusts its transmit timing.

The UE 110 or/and 115 that switches from cellular communication to D2D communication advantageously maintains the TA signaled thereto by the respective serving radio transceiver Preferably, in order to average the fast fading effects (i.e., signal attenuations depending on the scattering effects occurring between transmitter and receiver), the discovery procedure may be repeated two or more times, e.g. several times over different time/frequency PRACH slots, and the related measures conveniently averaged. For example, a simple linear average of the power level of the received PRACH preamble measured in different PRACH slots can be used to smooth the time-frequency variations of the propagation channel. More complex averaging functions may be advantageously applied in order to take into account the different instants at which the measurements are collected.

In order to further enhance the accuracy of the measurements and limit the effect of the interference, a certain number of Zadoff-Chu sequences used for the generation of the PRACH preamble can be reserved and used only for the discovery procedure. The Zadoff-Chu sequences are complex-valued mathematical sequences which, when applied to radio signals, give rise to an electromagnetic signal of constant amplitude, whereby cyclically shifted versions of the sequence imposed on a signal result in zero cross-correlation with one another at the receiver (e.g., the eNodeB 105 and the UE 110 and 115); in LTE/LTE-A standard, Zadoff-Chu sequences are used for reducing signals cross-correlation and reciprocal interferences among PRACH preambles transmitted by different UE.

Based on the received power levels (power level measured by the radio transceivers, and measures of power level reported to the radio transceivers by the UE), the eNodeB 105 can estimate the ratio between path-losses (i.e., loss of signal power during propagation mainly depending on the distance between transmitter and receiver) of the D2D and the cellular communication links. The received power levels can be expressed by the following formulas (in linear units, e.g. Watts):

$$P_{RX,UE_1} = P_{TX,UE_2} \cdot L_{UE_1,UE_2} \text{ [W]}, \tag{1}$$

$$P_{RX,UE_2} = P_{TX,UE_1} \cdot L_{UE_2,UE_1} \text{ [W]}, \tag{2}$$

$$P_{RX,B_1} = P_{TX,UE_1} \cdot L_{B_1,UE_1} \text{ [W] and} \tag{3}$$

$$P_{RX,B_2} = P_{TX,UE_2} \cdot L_{B_2,UE_2} \text{ [W]}, \tag{4}$$

where $P_{RX,UE_1}$ and $P_{RX,UE_2}$ are the received power levels at the first UE 110 and at second UE 115, respectively, of the signal transmitted by the second UE 115 and first UE 110 respectively. $P_{RX,B_1}$ and $P_{RX,B_2}$ are the power levels of the signal transmitted by the first UE 110 and second UE 115 as received at the respective serving cells. $L_{UE_1,UE_2} = L_{UE_2,UE_1}$ is the attenuation caused by the physical propagation channel between the first UE 110 and the second UE 115. $L_{B_1,UE_1}$ and $L_{B_2,UE_2}$ are the attenuations caused by the physical propagation channel between the first UE 110 and its serving cell and between the second UE 115 and its serving cell, respectively.

In an embodiment of the present invention, in order to achieve a better accuracy in the discovery procedure, the attenuations $L_{UE_1,UE_2}$, $L_{UE_2,UE_1}$, $L_{B_1,UE_1}$, and $L_{B_2,UE_2}$ preferably include all the detrimental propagation effects associated with a physical propagation channel, arising together with the path-loss, such as shadowing (attenuations depending on the presence of obstacles between transmitter and receiver) and fast-fading (already mentioned above).

Preferably, the eNodeB 105 is configured to switch from cellular communication to a D2D communication if the latter can be performed at the same rate of exchange of information, while using a sufficiently smaller amount of transmit power than the corresponding cellular communication. The reduction in the required UE 110 or 115 transmit power (i.e., a transmit power saving obtained by performing D2D communication instead of cellular communication) can be quantified by the ratio of the related attenuations. For example, the expected transmit power saving $PS_1$ and $PS_2$ of the first UE 110 and of the second UE 115, respectively, obtained by switching from cellular communication to D2D communication can be expressed as follows:

$$PS_1 = 10 \cdot \log_{10}\left(\frac{P_{RX,UE_2}}{P_{RX,B_1}}\right) = 10 \cdot \log_{10}\left(\frac{L_{UE_2,UE_1}}{L_{B_1,UE_1}}\right) \text{ [dB]} \quad (5)$$

and $$PS_2 = 10 \cdot \log_{10}\left(\frac{P_{RX,UE_1}}{P_{RX,B_2}}\right) = 10 \cdot \log_{10}\left(\frac{L_{UE_1,UE_2}}{L_{B_2,UE_2}}\right) \text{ [dB]}. \quad (6)$$

Advantageously, in order to allow the eNodeB 105 discriminating whether to switch from the cellular communication to the D2D communication and, possibly, back from the D2D communication to the cellular communication, a power-saving threshold $TH_{D2D}$ may be defined. The calculated transmit power savings, such as the transmit power saving $PS_1$ and $PS_2$ in the example at issue, are each one compared with the power threshold $TH_{D2D}$. When the transmit power saving exceeds the power-saving threshold $TH_{D2D}$ the D2D communication is preferred, since savings in terms of power needed to communicate with respect to the cellular communication are expected. Conversely, when the power saving is lower than the power-saving threshold $TH_{D2D}$, the cellular communication is preferred, since there will be not enough savings in terms of power needed to communicate in D2D with respect to the cellular communication. The above can be mathematically summarized as follows:

$$\begin{cases} PS_{1,2} \geq TH_{D2D} & \text{switch to or maintain } D2D \text{ communication} \\ PS_{1,2} < TH_{D2D} & \text{maintain cellular communication} \end{cases} \quad (7)$$

Preferably, the power-saving threshold is defined in order to take into account the difference between functional parameters of the receivers (e.g., Noise Figures of the UE 110 and 115 and of the respective serving cells) and/or the uncertainty of the measures (e.g., which effect may be reduced by defining a normalizing/corrective factor).

Figure 3:
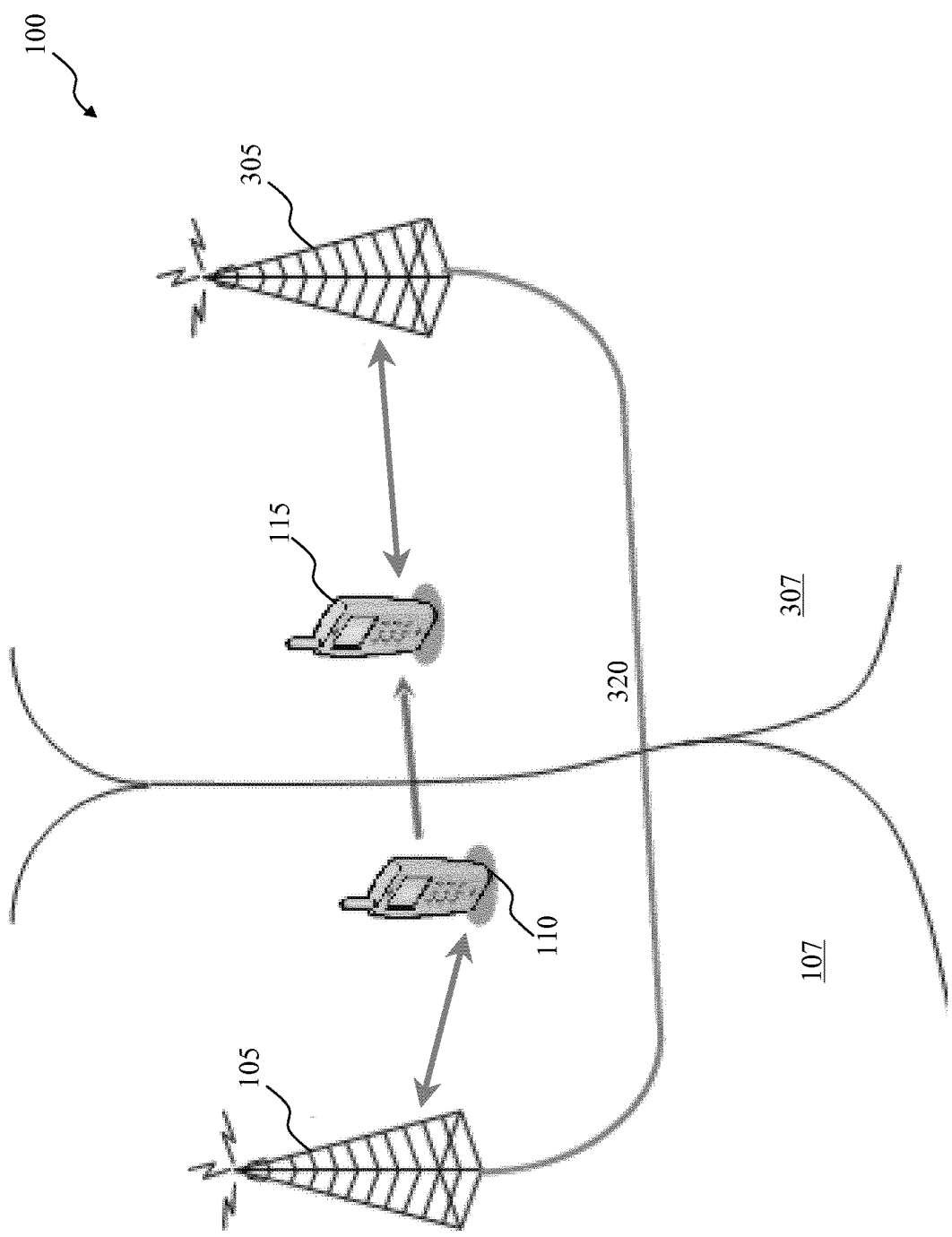
FIG. 3 is a schematic view of a larger portion of the mobile communication network comprising two adjacent eNodeB, each with a respective UE connected thereto according to another embodiment of the present invention.

According to an embodiment of the present invention, the discovery procedure may be performed also in the case in which the UE are connected to different eNodeBs, as will be now described by making reference to FIG. 3, which is a schematic view of portion of the mobile communication network 100 comprising two adjacent eNodeB, for example the eNodeB 105 (referred to as first eNodeB 105 in the following) and a second eNodeB 305 adjacent to the first eNodeB 105, each with a respective one of the UE 110 or 115 within the corresponding geographic areas 107 and 307 of coverage.

In the example at issue, the first UE 110 is served by a radio transceiver of the first eNodeB 105 while the second UE 115 is now served by a radio transceiver of the second eNodeB 305. The eNodeBs 105 and 305 are defined adjacent to each other since the geographic area 307 of coverage of the second eNodeB 305 is adjacent to the geographic area 107 of coverage of the first eNodeB 105. In such a scenario, the discovery procedure requires a coordinated action, and information exchange, between the eNodeBs 105 and 305. Preferably, the eNodeBs 105 and 305 mutually exchange information through a direct communication link therebetween; for example, in LTE/LTE-A the eNodeBs 105 and 305 can exchange information one another through a X2 interface 320 interconnecting the eNodeBs 105 and 305.

Figure 4:
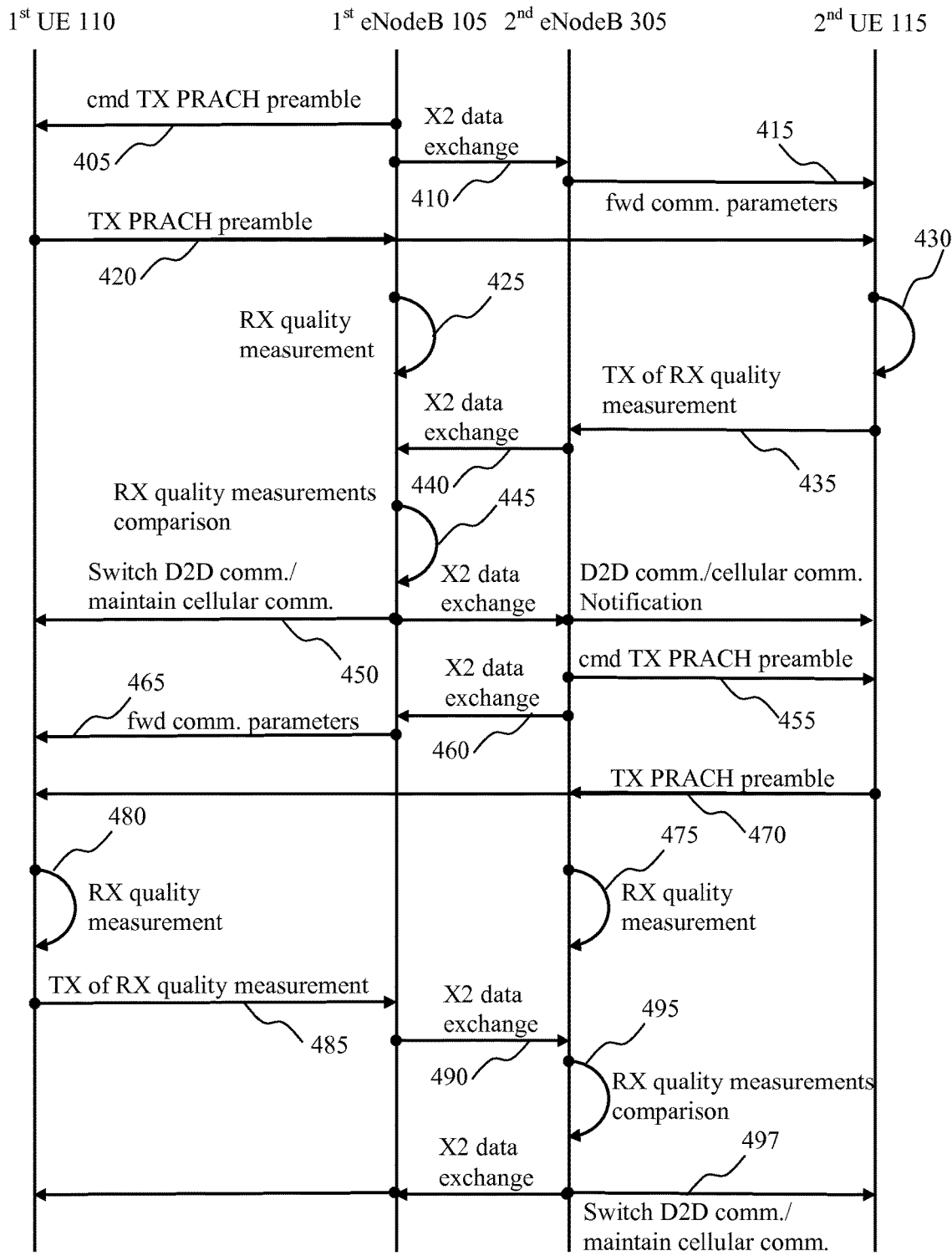
FIG. 4 is a schematic sequence diagram of a discovery procedure according to an embodiment of the present invention, referred to the scenario of FIG. 3.

The discovery procedure between the eNodeBs 105 and 305, of which FIG. 4 is a schematic sequence diagram of an embodiment according to the present invention, differs from the discovery procedure for the UE 110 and 115 both served by the first eNodeB 105 in what follows.

Let it be assumed that the discovery procedure is initiated at the first eNodeB 105 (even though the discovery procedure could be initiated at the second eNodeB 305 as well). The cell serving the first UE 110 commands the transmission of the PRACH preamble to the first UE 110, which is currently in cellular communication with the second UE 115 (first phase 405 of the discovery procedure). At the same time, the first eNodeB 105 transmits, via the X2 interface 320, to the second eNodeB 305 the communication parameters necessary for the detection of the PRACH preamble transmitted by the first UE 110 (as described above, second phase 410 of the discovery procedure). At the second eNodeB 305, the cell serving the second UE 115 signals the communication parameters received from the first eNodeB 105 to the second UE 115 (third phase 415 of the discovery procedure), which is then able to receive and identify the PRACH preamble transmitted by the first UE 110 (fourth phase 420 of the discovery procedure).

The second UE 115 and the first eNodeB 105 measure the quality of the received PRACH preamble (similarly as described above, fifth and sixth phases 425 and 430 of the discovery procedure). Then, the second UE 115 reports its measurement to its serving cell of the second eNodeB 305 (seventh phase 435 of the discovery procedure), which transmits such measurement to the first eNodeB 105 via the X2 interface 320 (eighth phase 440 of the discovery procedure).

The first eNodeB 105 compares the measurement reported by the second UE 115 with the measurement directly performed by the cell serving the first UE 110 (ninth phase 445 of the discovery procedure) and determines whether a D2D communication from the first UE 110 towards the second UE 115 can be conveniently set-up instead of the cellular communication and the switching to D2D communication (or the continuation of cellular communication) is notified to both UE 110 and 115, with such communication that is sent by the first eNodeB 105 to the second eNodeB 305 through the X2 interface 320 and then transmitted to the second UE 115 by the second eNodeB 305 (tenth phase 450 of the discovery procedure).

As in the previous case, the phases just described are repeated inverting the roles of the eNodeBs 105 and 305 and of the UE 110 and 115, to determine whether a D2D communication can be conveniently set-up, instead of the cellular communication, from the second UE 115 towards the first UE 110 (phases 455-497 of the discovery procedure schematized in FIG. 4).

Thanks to the discovery procedure according to an embodiment of the present invention, the eNodeBs 105 and 305 can calculate transmit power savings $PS'_1$ and $PS'_2$, which are calculated as:

$$PS'_1 = 10 \cdot \log_{10}\left(\frac{P_{RX,UE_2}}{P_{RX,B_1}}\right) = 10 \cdot \log_{10}\left(\frac{L_{UE_2,UE_1}}{L_{B_1,UE_1}}\right) \text{ [dB]} \quad (8)$$

and $$PS'_2 = 10 \cdot \log_{10}\left(\frac{P_{RX,UE_1}}{P_{RX,B_2}}\right) = 10 \cdot \log_{10}\left(\frac{L_{UE_1,UE_2}}{L_{B_2,UE_2}}\right) \text{ [dB]}, \quad (9)$$

where $P_{RX,B_1}$ is the received power level at the cell (of the first eNodeB 105) serving the first UE 110 of the PRACH preamble transmitted by the first UE 110 and $P_{RX,B_2}$ is the received power level at the cell (of the second eNodeB 305) serving the second UE 115 of the signal transmitted by the second UE 115. The calculated transmit power saving $PS'_1$ and $PS'_2$ are exchanged between eNodeBs 105 and 305 and may be compared, independently by each one of the eNodeBs 105 and 305, with the power-saving threshold $TH_{D2D}$ in order to independently determine if it is advantageous to switch from cellular communication to a D2D communication for the corresponding UE 110 or 115 connected thereto towards the other UE 115 or 110, i.e.:

$$\begin{cases} PS'_{1,2} \geq TH_{D2D} & \text{switch to or maintain } D2D \text{ communication} \\ PS'_{1,2} < TH_{D2D} & \text{maintain cellular communication} \end{cases} \quad (10)$$

In an embodiment according to the present invention, once at least one D2D communication has been established between the UE 110 and 115 (after the above described discovery procedure), each D2D communication is performed under control of the mobile communication network 100.

It should be noted that, even though in the above reference is made only to an analysis of a power level of the probe signal transmitted by the UE 110 and 115, nothing prevents from designing the mobile communication network 100 so as to check others radio parameters of the UE 110 and 115 in order to determine the switching from cellular communications to a D2D communications and, vice-versa, from D2D communications to cellular communications. For example, the mobile communication network 100 according to an embodiment of the present invention, evaluates the interference level experienced at the radio transceiver stations based on the transmitted probe signals and may decide the switching from cellular communications to a D2D communications and vice-versa if a lower interference is expected.

Figure 5:
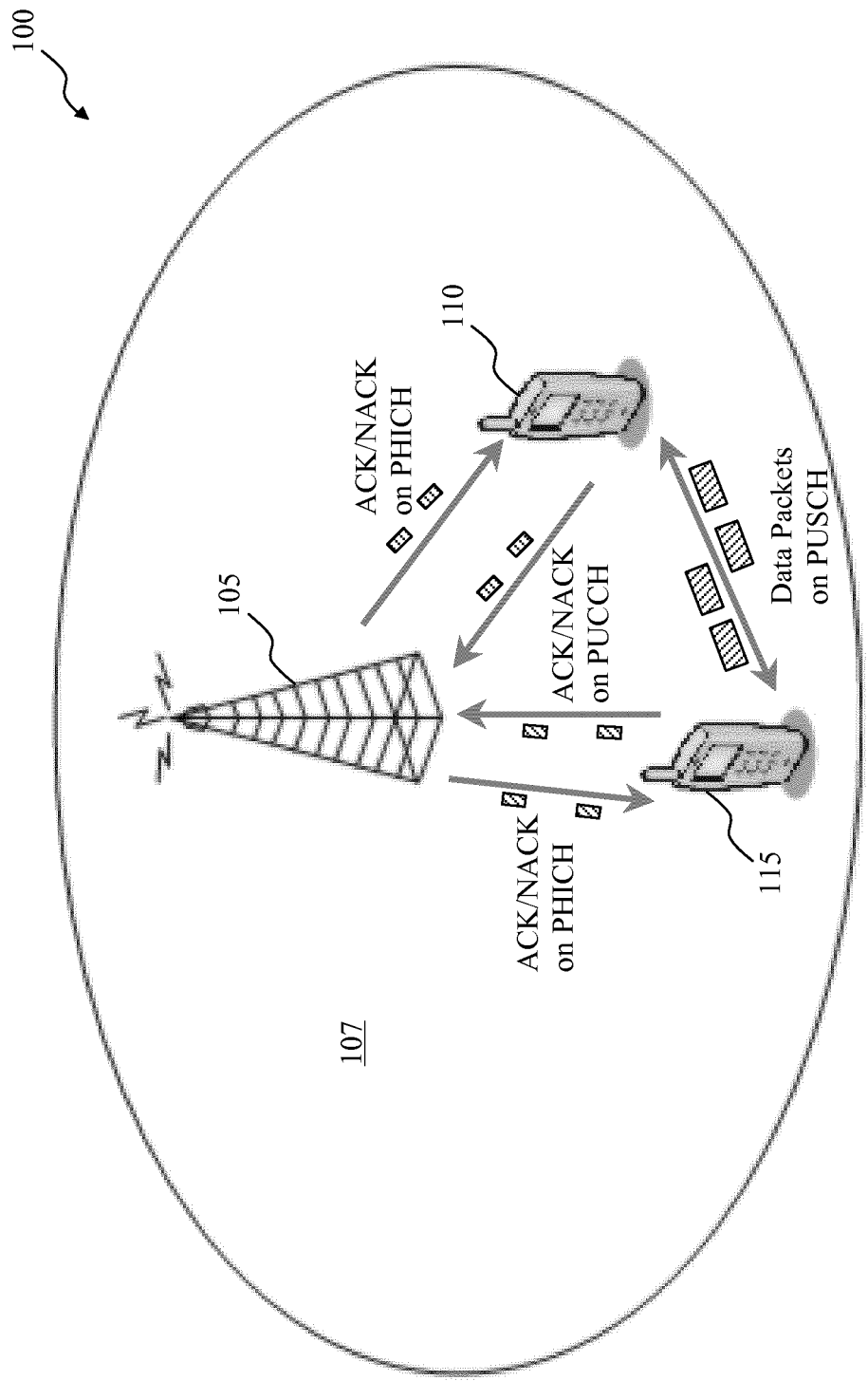
FIG. 5 schematically shows a symmetric D2D communication between the UE both located within the area of coverage of the eNodeB.
Figure 6:
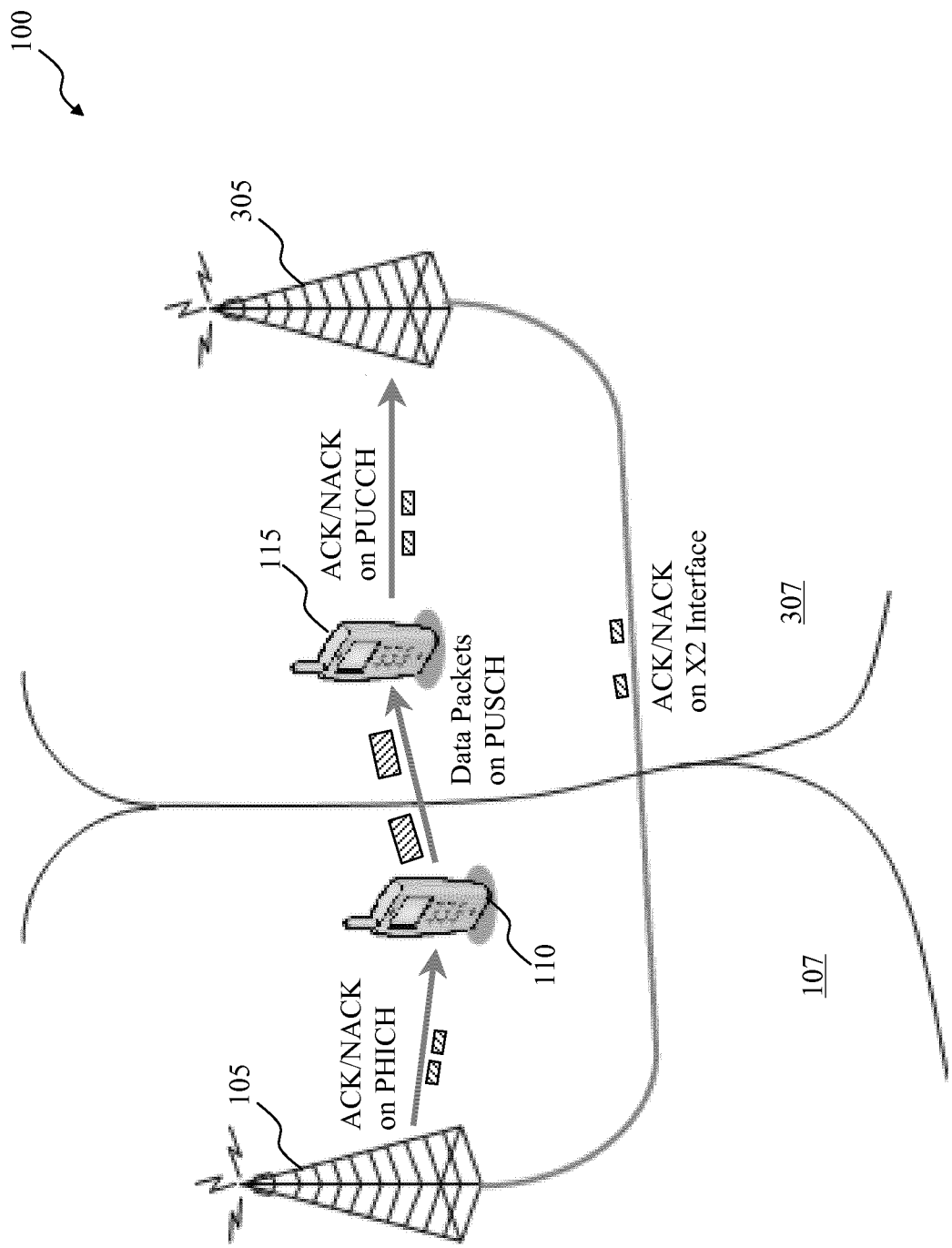
FIG. 6 schematically shows an asymmetric D2D communication between a first UE, located within the coverage area of a first eNodeB, and a second UE, within the coverage area of a second eNodeB adjacent to the first eNodeB.

The D2D communication control by the mobile communication network 100 will now described by referring to FIGS. 5 and 6. FIG. 5 schematically shows a symmetric D2D communication between the UE 110 and 115 both located within the area of coverage 107 of the first eNodeB 105. FIG. 6 shows instead an asymmetric D2D communication between the UE 110, located within the coverage area 107 of the first eNodeB 105, and the UE 115, within the coverage area 307 of the second eNodeB 305.

Preferably, D2D communication is controlled by the mobile communication network 100 by splitting the control and data "planes" of the D2D communication in separate paths (i.e., control and data information, or packets, are separately managed one from the other).

In particular, the control information, which is carried by the Physical Downlink Control CHannel (PDCCH), Physical Broadcast CHannel (PBCH), Physical Control Format Indicator CHannel (PCFICH) and Physical Hybrid-ARQ Indicator CHannel (PHICH) in downlink (i.e., from the eNodeB 105 and/or 305 towards the UE 110 and/or 115), and by the Physical Uplink Control CHannel (PUCCH) in uplink (i.e., from the UE 110 and/or 115 towards the eNodeB 105 and/or 305) continues to be exchanged between the considered UE 110 and 115 and the corresponding eNodeB 105 and/or 305, even when the D2D communication is ongoing between the UE 110 and 115. Therefore, the mobile communication network 100 is capable of managing the power level used for signal transmission of both symmetric D2D communication and asymmetric D2D communication, and the mobile communication network 100 is also capable of verifying the amount of data exchanged during such symmetric and asymmetric D2D communication as well.

As known, the typical power control procedure defined in LTE/LTE-A standard for the PUCCH (control plane of both cellular and D2D communication) is independent from the power control procedure of the PUSCH (data plane of both cellular and D2D communication). Advantageously, the transmit power level used by the UE 110 and 115 for transmitting over the PUCCH may be adjusted in order for the transmitted signals to be correctly received by the serving eNodeB 105 and/or 305, while the power level used by the UE 110 and 115 for transmitting over the PUSCH may be adjusted (e.g., reduced) when transmitting data through a D2D communication towards the other UE 115 or 110 (also referred to as companion UE 115 or 110 in the following), respectively.

As known, the PDCCH carries the Downlink Control Information (DCI), which includes scheduling assignments (for both uplink and downlink radio resources) and other control information that is necessary for UE demodulation. For example, the supported DCI formats for the LTE Release 10 standard are listed in the following Table 1.

| DCI format | Purpose |
| --- | --- |
| 0 | PUSCH grants for uplink transmissions |
| 1 | PDSCH assignments with a single codeword |
| 1A | PDSCH assignments with a single codeword using a compact format and random access procedure initiated by a PDCCH order |
| 1B | PDSCH assignments with a single codeword and precoding information (rank-1 transmission) |
| 1C | PDSCH assignments with a single codeword using a very compact format |
| 1D | PDSCH assignments for multi-user MIMO with precoding and power offset information |
| 2 | PDSCH assignments for closed-loop MIMO operation |
| 2A | PDSCH assignments for open-loop MIMO operation |
| 2B | PDSCH assignments for dual layer beamforming |
| 2C | PDSCH assignments for up to 8 layer transmission |
| 3 | Transmit Power Control (TPC) commands for multiple users For PUCCH and PUSCH with 2-bit power adjustments |
| 3A | Transmit Power Control (TPC) commands for multiple users For PUCCH and PUSCH with 1-bit power adjustments |
| 4 | PUSCH grants for UL transmissions with multi-antenna port transmission mode |

In an embodiment of the present invention, the following formats can be re-used, for the control of the D2D communication between the UE 110 and 115.

DCI format 0 can be used for the allocation of the resources to the UE 110 and/or 115 that transmits data packets to the companion UE via a D2D communication link. The same DCI format 0 can be used to notify to the receiving (companion) UE 115 and 110 the resource blocks in the PUCCH that must be demodulated. Preferably, a single DCI message may be transmitted to both UE 110 and 115 simultaneously with minor modifications, with respect to the typical DCI message, such minor modifications being related to additional information that has to be conveyed together with the single DCI message. An example of such additional information is the indication of the role of each UE 110 and 115 in the D2D communication (i.e. transmitter or receiver) and the identities of the two (or more) UE 110 and 115 for which the message is intended. DCI format 3 and 3A may instead be used to carry power control bits (i.e., used to instruct the UE 110 and 115 to adjust the respective transmitting power) for the PUCCH and/or the PUSCH.

In the preferred embodiment of the present invention, when at least one of the UE 110 or 115 is transmitting in D2D communication, the transmitted data are exchanged with the companion UE 115 or 110 through a TDD (Time Division Duplex) protocol and the UE 110 or 115 uses, for transmitting the data packets, the PUSCH on an uplink frequency band (i.e., a set of frequencies for uplink radio resources).

Figure 7A:
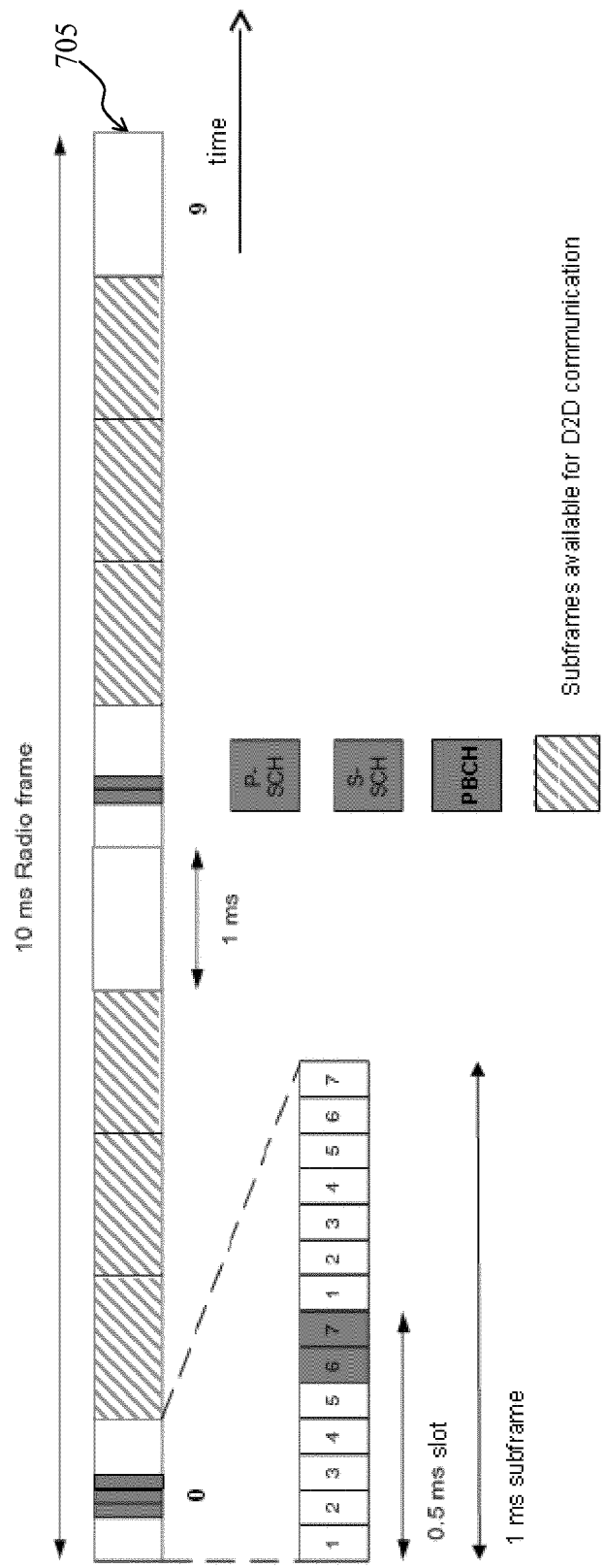
FIG. 7A is a schematic representation of a generic frame according to LTE frame structure type 1.

In case the UE 110 and/or 115 is/are equipped with only one receiver chain, in order to allow a continuous monitoring of the PBCH and synchronization channels P-SCH, S-SCH (Primary and Secondary Synchronization CHannels) when the UE 110 and/or 115 is/are involved in a D2D communication, a scheduler (e.g., implemented in the eNodeB 105 for scheduling the use uplink and/or downlink radio resources) should avoid scheduling the UE 110 and 115 in the subframes 0 and 5 that are reserved for carrying P-SCH and S-SCH. Similarly, subframes 4 and 9 may be used for transmission of paging messages and therefore the scheduler should avoid scheduling the UE 110 and 115 for D2D communication. It follows that in case of FDD duplexing, subframes 1, 2, 3, 6, 7 and 8 can be used for D2D communication, as depicted in FIG. 7A, which is a schematic representation of a generic frame 705 according to LTE frame structure type 1.

Figure 7B:
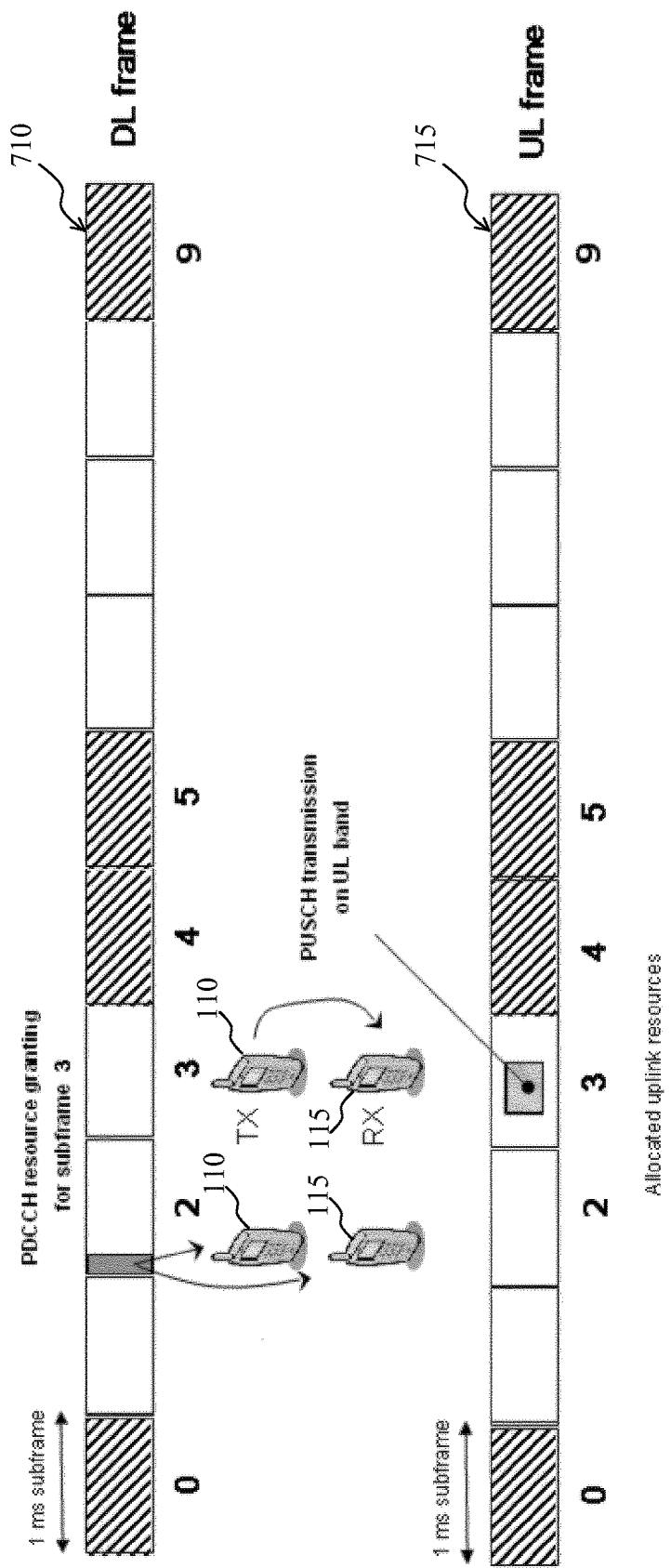
FIG. 7B that is a schematic representation of a downlink frame and of an uplink frame configured to manage a D2D communication according to an embodiment of the present invention.

Since the UE 110 and/or 115 equipped with a single receiver chain cannot simultaneously receive the PDCCH, PHICH and/or PCFICH on the downlink frequency band and at the same time the data (transmitted by the companion UE) on the uplink frequency band, it is necessary to avoid the superposition of these two operations. To this end, as can be appreciated in FIG. 7B that is a schematic representation of a downlink frame 710 and of an uplink frame 715, a UE 110 or 115 involved in the D2D communication monitor the PDCCH, PHICH and PCFICH only in the subframes 0, 4, 5 and 9 and in the subframes in which such UE 110 or 115 is scheduled to act as a transmitter. In addition a scheduling grant provided by the scheduler to the two (or more) UE 110 and 115 involved in D2D communication using the PDCCH DCI format 0 may refer (i.e., it is applied) to a next subframe of the uplink frame 715 available for D2D communication. In other words, an uplink scheduling grant received in a subframe N of the downlink frame 710 will trigger a D2D data transmission (and reception) in a following subframe N+k (where k≥1 is set taking into account a reception/transmission processing time of the UE 110 and 115; in the example of FIG. 7B k is equal to 1).

In order to allow the companion UE 115 or 110 to receive data packets over the PUSCH transmitted by the UE 110 or 115 in D2D communication, the uplink scheduling grant for the UE 110 and 115 must be transmitted by the eNodeB 105 or 305 also to the companion UE 115 or 110.

Conversely, if the UE 110 and 115 have a more complex receiver structures (e.g., dual receiver architectures), or in case of UE 110 and 115 with advanced filtering arrangements, the D2D communication may be performed with simultaneous transmission/reception of data/control information to/from the companion UE and the serving eNodeB. In the case of UE 110 and 115 with advanced filtering arrangements, some restriction on the eNodeBs 105 and/or 305 scheduling may still be required (e.g., the resource blocks allocated to the UE 110 and 115 with advanced filtering arrangements in the same Transmission Time Interval—TTI—should be sufficiently separated in the frequency domain, so that the self-interference problem does not preclude the communication).

In an embodiment of the present invention, the PUCCH is used to feed back to the eNodeB the Channel State Information (CSI) generated by the UE 110 and 115. The CSI comprises the Channel Quality Indicator (CQI), the Precoding Matrix Index (PMI), and the Rank Indicator (RI). In addition, the PUCCH is also used to carry the acknowledgments of successful/unsuccessful receipt (ACK/NACK, respectively) for the received/unreceived data packets (e.g., an ACK/NACK for each data packet) and the Scheduling Requests (SR). The main PUCCH formats as defined in LTE Release 8 are listed in the following table.

| Format | Message type | Encoded Message size [bits × subframe] | Modulation (data part) | Multiplexing capacity[1] [UE × region] |
|---|---|---|---|---|
| 1 | Scheduling Request | — | On/Off Keying | 36, 18, 12 |
| 1a | 1 bit ACK/NACK | 1 | BPSK | 36, 18, 12 |
| 1b | 2 bit ACK/NACK | 2 | QPSK | 36, 18, 12 |
| 2 | CQI | 20 | QPSK | 12, 6, 4 |
| 2a | CQI + 1 bit ACK/NACK | 21 | QPSK + BPSK | 12, 6, 4 |
| 2b | CQI + 2 bit ACK/NACK | 22 | QPSK + QPSK | 12, 6, 4 |

[1]Multiplexing capacity is expressed as {Maximum, Typical, Minimum} value of UE per region for the normal cyclic prefix (CP) case According to an embodiment of the present invention, the PUCCH formats listed above are expediently reused for implementing D2D communication, with only limited changes in the meaning of the carried information. In particular, the ACK/NACKs in case of D2D communication are generated in response to the packets received at a UE 110 or 115 on the PUSCH channel and transmitted by the D2D companion UE 110 or 115. This is different than the case of cellular communication, where the ACK/NACK information is generated in response to the packets received on the PDSCH. The ACK/NACKs are transmitted by the receiving UE 115 or 110 to the respective serving cell on the PUCCH and are then forwarded on the PHICH to the transmitting UE 110 or 115 according to the (known) Hybrid-ARQ (H-ARQ) procedure.

In an alternative embodiment of the present invention, in order to reduce latency in the mobile communication network 100 the ACK/NACKs are simultaneously received both at the UE 110 and 115 and at the serving cells of the eNodeB 105. In this way, the UE 110 and 115 are able to prepare the retransmission of unreceived packets associated with a NACK, while the mobile communication network 100 is able to prepare the next scheduling grants and to control the associated transmission power levels (as described in the following).

According to an embodiment of the present invention, the CQI are expediently reused for D2D communication, with only a slight different implementation with respect to the LTE/LTE-A standard. The UE 110 and 115 involved in a D2D communication should estimate and report two different CQI values. These two CQI values are denoted in the following as "cellular CQI" and "D2D CQI".

The cellular CQI is identical to the CQI that is typically estimated by the UE 110 and 115 in cellular communication mode. The cellular CQI value is related to the quality of the PDSCH experienced by the UE 110 and 115 with respect to their serving cell. The cellular CQI may be estimated by using the Common Reference Signals (CRS) defined in Release 8 or the Channel State Information-Reference Signals (CSI-RS) defined Release 10 that are both transmitted by the cell serving the UE 110 and 115. The cellular CQI is necessary for compatibility with the procedures executed by the mobile communication network 100, such as for example in the computing of the number of Control Channel Elements (CCEs) used for the transmission of the PDCCH channel.

In addition, the availability of the cellular CQI at the serving cell ensures a fast resume of the cellular communication if the D2D communication link suddenly worsens (as described in the following). The cellular CQI is also needed when the UE 110 and/or 115 has established both a cellular communication link with the mobile communication network 100 and a D2D communication link with the companion UE 115 and/or 110.

The D2D CQI value is related to the quality of the PUSCH experienced by the UE 110 and/or 115 with respect to the companion UE 115 and/or 110 involved in the D2D communication. The D2D CQI can be estimated at a UE 110 or 115 through the DeModulation Reference Signals (DMRS) transmitted by the companion UE 115 or 110 on the PUSCH. The purpose of the D2D CQI is to allow the eNodeB 105 and/or 305 to select the most appropriate Modulation and Coding Scheme (MCS) that maximizes the capacity on the D2D communication link. The serving radio transceiver of the eNodeB 105 and/or 305 receives the D2D CQI from the served UE 110 and/or 115 and transmits an uplink scheduling grant on the PDCCH to the corresponding companion UE 115 and/or 110; the uplink scheduling grant allocates the appropriate number of Resource Blocks (RBs) and MCS.

For example, by considering that the cells of the eNodeB 105 are the entities in the mobile communication network 100 that perform the allocation of the physical resources, the RBs allocated to a D2D communication may be allocated exclusively to the UE 110 and 115 which are performing D2D communication, or may be reused also for cellular communication if the spatial reuse distance is sufficient for avoiding interference. The possibility to reuse the RBs allocated to D2D communication also for cellular communication may be estimated by the eNodeB by measuring the uplink interference due to the D2D communication of the UE 110 and 115. In any case, the interference caused by the UE 110 and 115 may be controlled by the eNodeB, for example, by leveraging the RBs and MCS assigned by means of the scheduling grant.

Examples of CQI reporting schemes (i.e., periodic transmissions of the CQI messages) for cellular and D2D communication are depicted in FIGS. 8A and 8B, respectively. FIG. 8A shows the CQI reporting on the PUCCH channel for the UE 110 and 115 when involved in a cellular communication and configured with a periodic reporting rate of 5 ms. FIG. 8B shows the CQI reporting still on the PUCCH channel for the UE 110 and 115 when involved in a D2D communication and configured with a periodic reporting rate of 2 ms.

In the D2D communication, the cellular CQI and D2D CQI reports can be simply multiplexed in time and carried in alternating PUCCH slots. This may be easily implemented by doubling a CQI reporting frequency for the UE 110 and 115 involved in D2D communication (as shown in FIG. 8B). It should be noted that the reporting rate of the cellular CQI would be nearly unchanged compared with the CQI reporting frequency of the cellular communication. Other configuration are obviously possible, such as for example defining different reporting rates for the cellular CQI and the D2D CQI, or using a differential transmission by sending the cellular CQI and the difference between the cellular CQI and the D2D CQI (in the same or different PUCCH messages).

In the preferred embodiment of the present invention, a Scheduling Requests (SRs) is sent from the UE 110 and 115 in D2D communication to the mobile communication network 100 through the PUCCH channel, in order for such UE to be provided with corresponding scheduling grants by the mobile communication network 100.

Once a D2D communication is established between the UE 110 and 115, the mobile communication network 100 from time to time, for example periodically, may check if the D2D communication is still convenient with respect to the cellular communication.

In an embodiment of the present invention, after the switching to the D2D communication, the eNodeB 105 repeatedly (for example periodically or randomly) monitors the transmit power savings $PS_1$ and/or $PS_2$, or $PS'_1$ and/or $PS'_2$ of the connected UE 110 and 115 (by reiterating the discovery procedure described above), in order to verify if the power savings $PS_1$ and/or $PS_2$, or $PS'_1$ and/or $PS'_2$ remain above (or at least equal to) the power-saving threshold $TH_{D2D}$ (i.e., that the D2D communication is convenient in terms of power). If the power savings $PS_1$ and/or $PS_2$, or $PS'_1$ and/or $PS'_2$ result lower than the power-saving threshold $TH_{D2D}$ the corresponding D2D communication is terminated and replaced by a cellular communication.

Advantageously, a second power-saving threshold $TH_{cell}$, lower that the (first) power-saving threshold $TH_{D2D}$, may be defined. When transmit power savings $PS_1$ and/or $PS_2$, or $PS'_1$ and/or $PS'_2$ drop below the second power-saving threshold $TH_{cell}$ the eNodeB 105 ends the corresponding D2D communication and resumes back the cellular communication, i.e.:

$PS_{1,2}$ or $PS'_{1,2} \leq TH_{cell} < TH_{D2D}$ revert to cellular communication (11).

The second power-saving threshold $TH_{cell}$ is selected suitably lower than the first power-saving threshold $TH_{D2D}$ in order to create an hysteresis that prevents frequent switching from D2D communication to cellular communication, and vice-versa from cellular communication to D2D communication caused by transmit power saving $PS_1$ and/or $PS_2$ varying in the neighborhood of the first power-saving threshold $TH_{D2D}$.

In addition or as an alternative, the D2D CQI and the cellular CQI, in conjunction with the Sounding Reference Signal (SRS) and/or the DeModulation Reference Signal (DMRS), may also be used by the mobile communication network 100 to decide if a D2D communication has to be conveniently switched to a cellular communication or not.

The SRS and/or the DMRS may be used to estimate the channel quality in uplink. Based on the comparison between the D2D CQI and the cellular CQI, e.g. if D2D CQI≤cellular CQI, the mobile communication network 100 can trigger the SRS transmission and/or can start to measure the DMRS transmissions of both the UE 110 and 115. Based on the measurement of the SRS and/or DMRS transmissions the mobile communication network 100 can determine to switch the D2D communication to the cellular communication. In fact, in order to better estimate the quality of the cellular communication to be compared with the D2D communication, in addition to the cellular CQI (needed to estimate the downlink channel quality from the eNodeB and towards one UE), the DMRS and/or SRS based measurements help to estimate the uplink channel quality of the uplink between the second UE and the eNodeB. Based on the SRS/DMRS measurement the eNodeB can estimate the SINR (Signal to Interference plus Noise Ratio) and then the available capacity in uplink and, in conjunction with the cellular CQI, they can be compared with the D2D CQI.

For example, the reiteration of the discovery procedure, in order to assess whether to maintain the D2D communication or switch back to the cellular communication, may be performed periodically with a relatively low frequency (e.g., in the order of hundreds of milliseconds such as for example every ten frames) since it requires a dedicated PRACH preamble transmission, while the assessment based on the D2D CQI, Cellular CQI, SRS and DMRS may be performed more frequently (e.g., in the order of milliseconds such as for example every frame) since the D2D CQI, Cellular CQI, SRS and DMRS are already reported to the eNodeB 110 and/or 115 during D2D and cellular communications.

A further element that allows the mobile communication network 100 to control the interference generated by the UE 110 and 115 in D2D communication is the power control bit(s) transmitted on the PDCCH with the DCI formats 3 and 3A for the closed loop power control procedure. The power control bit(s) may be used to limit the power level of the signals transmitted by the UE 110 and/or 115 in D2D communication. For example, the power control bit(s) for the signals transmitted on the PUSCH may be derived as a suitable function of one or more of the following metrics or measures:

UE transmit Power HeadRoom (PHR) that indicates how much transmission power is left for a UE to use in addition to the power being used by the current transmission

D2D CQI

BLock Error Rate (BLER) estimated on the percentage of received ACKs and NACKs as follows:

$$BLER_{est} = \frac{\#NACK}{\#NACK + \#ACK}. \quad (12)$$

In general, the function used by the serving radio transceiver of the eNodeB 105 for the calculation of the power control bit(s), that are then sent on the PDCCH to the UE 110 and 115 involved in a D2D communication, can be expressed as follows:

$$CLPC_{bit} = f[PHR, CQI_{D2D}, BLER_{est}], \quad (13)$$

where $CLPC_{bit}$ is (are) the power control bit(s) sent on the PDCCH to the transmitting UE 110 and/or 115 in D2D communication, PHR is the power headroom reported by the UE 110 and/or 115, $BLER_{est}$ is the BLER estimated by the serving radio transceiver with respect to an ACK/NACKs flow received on the PUCCH, and $CQI_{D2D}$ is the D2D CQI reported on the PUCCH by the receiving (companion) UE 115 and/or 110.

Figure 9A:
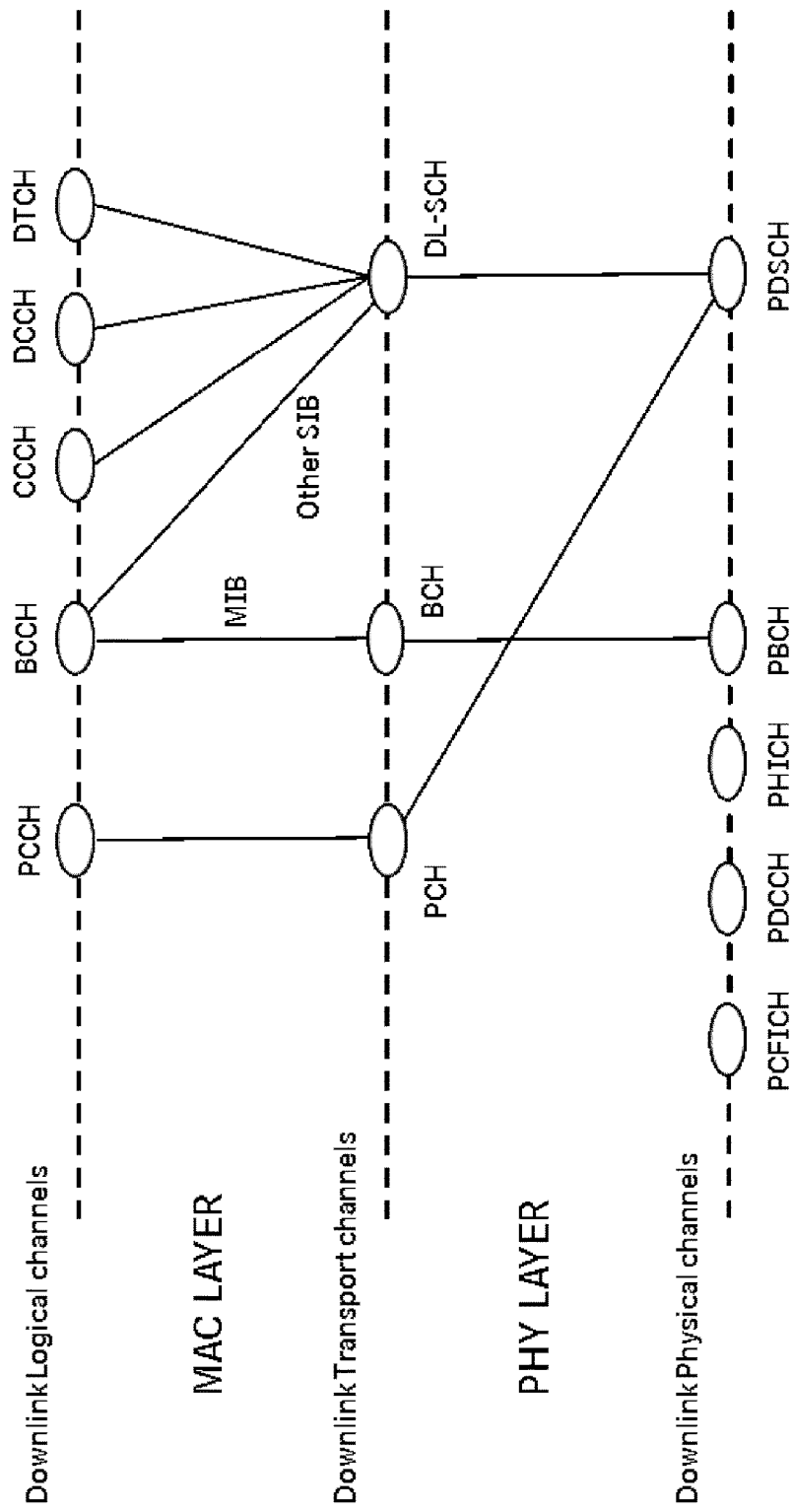
FIG. 9A is a diagram of the mapping of downlink logical channels on the downlink transport channels, and the mapping of the downlink transport channels on the downlink physical channels.

In an embodiment of the present invention, a separation of the control and data flows for the Radio Resource Control (RRC) signaling is also provided. Dedicated RRC messages are transferred across Signaling Radio Bearers (SRBs), which are mapped via the Packet Data Convergence Protocol (PDCP) and Radio Link Control (RLC) layers onto logical channels, including either the Common Control Channel (CCCH), during RRC connection establishment, or a Dedicated Control Channel (DCCH) when the UE 110 and 115 are already in the RRC connected state. CCCH and DCCH are both mapped at the physical layer level on the PDSCH. System Information and Paging messages are mapped directly to logical channels, namely to the Broadcast Control Channel (BCCH) and to the Paging Control Channel (PCCH) respectively. The PCCH is mapped on the PDSCH, while the BCCH is mapped either on the PBCH (for Master Information Blocks, MIB) or the PDSCH (for System Information Blocks, SIB) as schematized in FIG. 9A.

It should be noted that in case of UE 110 and 115 equipped with single receiver chain, the reception of the downlink RRC signaling (transmitted by the serving base station) at the UE 110 and 115 may be accomplished without any modification in the subframes 0, 4, 5 and 9, or in the subframes where the UE 110 and 115 in D2D communication act as a transmitter. In general, the period for the transmission of the RRC signaling can be set by the mobile communication network 100 in order to allow all the UE within the whole area of coverage of the mobile communication network 100, including those involved in D2D communications, to receive such information.

Figure 9B:
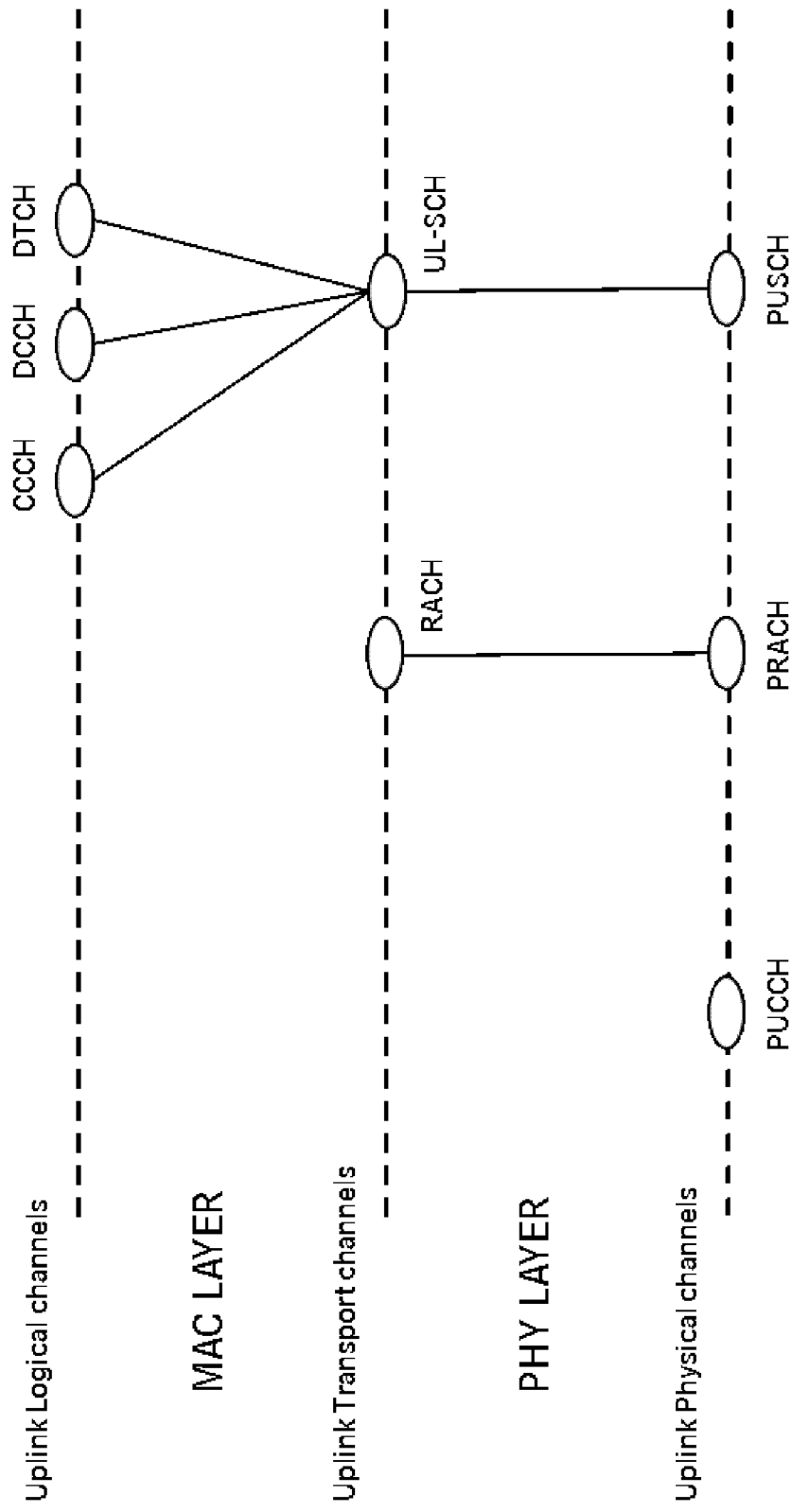
FIG. 9B is a diagram of the mapping of uplink logical channels on the uplink transport channels, and the mapping of the uplink transport channels on the uplink physical channels.

In uplink, as can be appreciated in FIG. 9B, the CCCH and DCCH are both mapped on the PUSCH. In this case, there could be a problem of data transmission at low power for the D2D communication and control information transmission at higher power on the same physical channel (i.e., the PUSCH). This problem can be solved in different ways.

For example, uplink control information is transmitted on PUSCH without UL-SCH data as specified in 3GPP TS 36.212 V8.8.0 (2009-12, section 5.2.4). As an alternative, different power scaling factor can be applied to the data and the control information. Considering that data and control information are mapped on different SC-FDMA subcarriers, data and control information transmission could be demodulated separately, i.e., the data is demodulated by the companion UE 115 and/or 110 and the control information is demodulated by the serving radio transceiver. This alternative solution requires some minor changes to an uplink SC-FDMA baseband transmitter of the UE 110 and 115.

Figure 10:
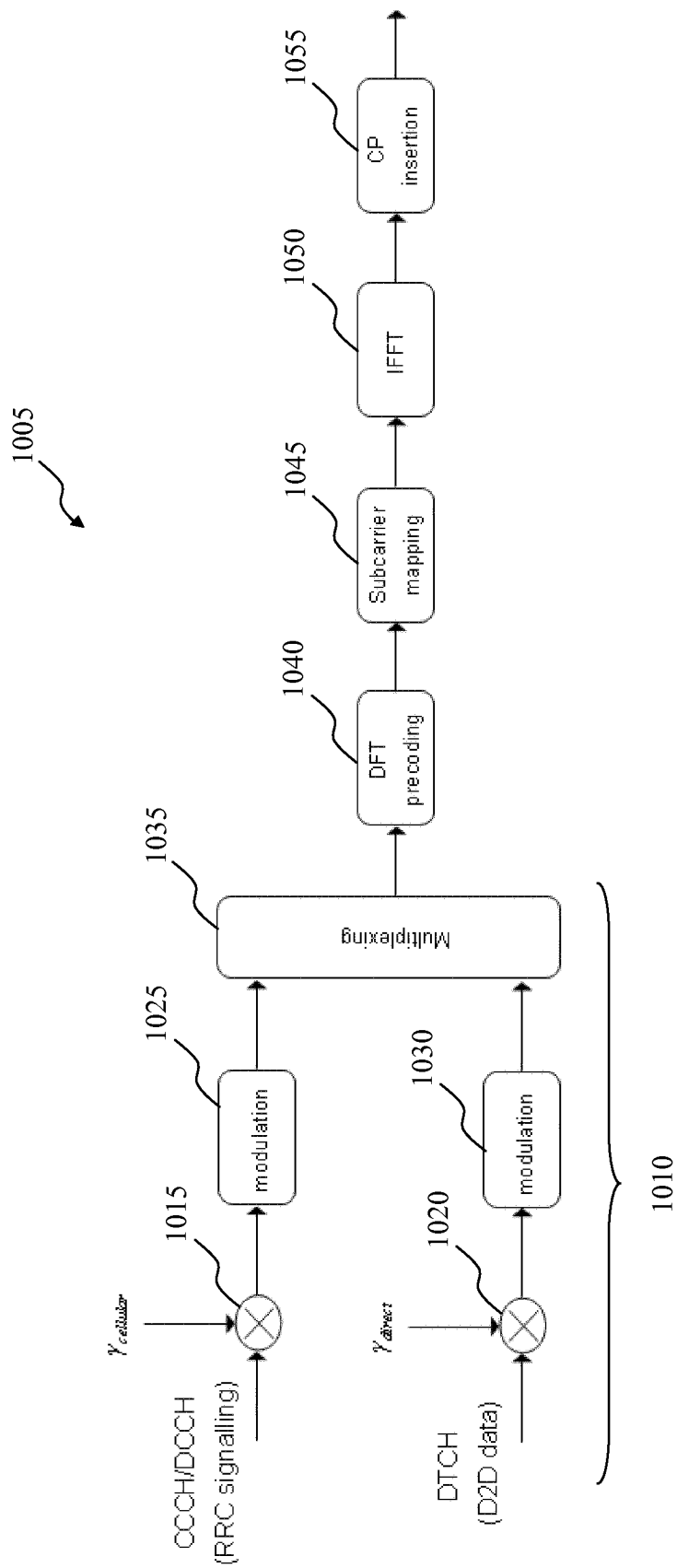
FIG. 10 is a schematic functional block diagram of an uplink SC-FDMA baseband transmitter according to an embodiment of the present invention.

A schematic functional block diagram of an exemplary uplink SC-FDMA baseband transmitter 1005 according to an embodiment of the present invention is depicted in FIG. 10. The uplink SC-FDMA baseband transmitter 1005 comprises a multiplexing portion 1010 and two combining elements 1015 and 1020 that introduce (e.g., multiply) power scaling factors $\gamma_{cellular}$ and $\gamma_{D2D}$ with control information (e.g., on CCCH/DCCH) and with D2D communication data information (e.g., on the Dedicated Traffic CHannel—DTCH), respectively. In other words, the power scaling factors $\gamma_{cellular}$ and $\gamma_{D2D}$ are used for scaling the control/data information to be transmitted (i.e., RCC signaling) to the serving radio transceiver and the D2D communication data to the companion UE 115 and/or 110 (as control/data packets), respectively. The control/data information combined with the respective power factor are modulated by respective modulating elements 1025 and 1030 in order to form a sequence of modulated complex symbols which are then multiplexed by a multiplexing element 1035. Then multiplexed and modulated complex symbols are transferred from the multiplexing portion 1010 to a Discrete Fourier Transform (DFT) precoder 1040. The Discrete Fourier Transform (DFT) precoder 1040 processes the multiplexed and modulated complex symbols obtaining corresponding DFT symbols. Then a subcarrier mapping element 1045 receives and maps DFT symbols to one (or more) subcarriers obtaining a set of complex symbols in the frequency domain. The complex symbols in the frequency domain are then received and transformed in time-domain symbols by means of an Inverse FFT (IFFT) element 1050. After that, a CP inserting element 1055 receives the time-domain symbols and adds the Cyclic Prefix (CP) thereto.

As a further alternative, the data and the control packets may be transmitted on different subframes or in different RBs in the same TTI.

In embodiments of the present invention described above, two different power control algorithms operate in parallel for data and control packets, respectively. The power control related to data packets is managed by the serving radio transceiver using the reported measures like PHR, ACK/NACK and D2D CQI (see equation 13). The power control of the control packets transmitted on PUSCH towards the radio transceiver could be based on the power control used for the PUCCH with a suitable offset, in order to take into account the different levels of protection used in the PUSCH and PUCCH.

Another signal that is transmitted by the UE 110 and 115 to the mobile communication network 100 is the Buffer Status Report (BSR). The BSR is needed to the scheduler in the radio transceiver in order to properly configure the scheduling grants that are sent by the scheduler to the UE 110 and 115. For example, the BSR may be transmitted on the DCCH and mapped on the PUSCH by UE 110 and 115 using the data/control multiplexing scheme implemented by the SC-FDMA transmitter schematized in FIG. 10.

In an embodiment of the present invention, group D2D communications can be supported, i.e. D2D communication among more than just two UE.

In order to support group D2D communications, the following modifications are applied with respect to the above-described procedures.

Let it be assumed that a group of (three or more) UE is in connected mode and in a group cellular communication with each other. The communication parameters of an UE of the UE group which is commanded (by its serving radio transceiver) to transmit the PRACH preamble are then communicated by the mobile communication network to all the other UE of the UE group. Preferably, the criteria described in the foregoing that are to be assessed by the network for deciding whether to switch a cellular communication link to a D2D communication link (as in the above described phases of the discovery procedure) are checked for each couple of UE of the UE group, and a symmetric or asymmetric D2D communication may be activated between each couple of UE of the UE group, independently of what is done for other couples of UE. The power saving for each D2D communication link established between a certain couple of UE of the UE group are then monitored by the network, as previously discussed, in order to switch back to a cellular communication link if the corresponding D2D communication link deteriorates.

In a group D2D communication it may happen that a UE of the UE group is not able to establish D2D communication links with all the other UE of the UE group, i.e., a certain UE may establish D2D communication links with only a subset of the UE of the UE group (which will be the companion UE of such certain UE). In this case, in an embodiment of the present invention the mobile communication network 100 receives the data packets transmitted by a transmitting UE of the UE group and then mirrors such data packets in downlink towards all those UE of the UE group with which the transmitting UE has not established a D2D communication link. In an alternative embodiment according to the present invention, one or more UE of the UE group with which the transmitting UE has established a D2D communication link, act as relays for the remaining UE of the UE group with which the transmitting UE has not established a D2D communication link, provided that such relay UE has established a D2D communication link with such remaining UE. This alternative embodiment of the present invention achieves a better power saving for the mobile communication network 100 with a lower interference level between D2D communications and cellular communications.

The scheduling grant transmitted to each UE involved in the group D2D communication is also communicated to the other UE of the UE group directly connected to this UE.

Based on the ACK/NACK reported by the subset of the (companion) UE in D2D communication with a transmitting UE, the serving eNodeB of the transmitting UE will request a re-transmission of a data packet to the transmitting UE if at least one companion UE has not received the transmitted data packet. In order to reduce the latency, the transmitting UE may be configured to receive and decode the ACK/NACK signals of the companion UE and to directly retransmit the transmitted data packet if at least one of the companion UE has not received the transmitted data packet. Otherwise, in another embodiment of the present invention (less efficient from a delay point of view) the serving eNodeB of the transmitting UE will mirror any NACK received from a companion UE to the transmitting UE.

Each UE of the UE group transmits a D2D CQI for each UE with which it has established a D2D communication link, i.e. to each of its companion UE. The serving eNodeB of the transmitting UE receives all the D2D CQIs sent by the companion UE in D2D communication with the transmitting UE, and uses the D2D CQI having the lowest value to derive the MCS to be configured in the scheduling grant of the transmitting UE. Other less conservative MCS selection criteria can be considered;

In the closed loop power control, the power control command is a function of all the D2D CQIs reported by the companion UE of the UE group that is in D2D communication with one transmitting UE.

Thanks to the present invention, the mobile communication network 100 can keep under its control both the setting up and the course of D2D communication links between UE. This advantageously allows the network to control the interference caused by the D2D communications on the conventional cellular communications. Besides, the regular cellular communication remains available as a backup, and ensures service continuity, in case the D2D communication links between the UE deteriorates. A further advantage is that a billing function can be easily implemented by the mobile communication network 100 with respect to the D2D communication, since the volume of data packets exchanged in D2D communications is continuously defined and monitored by the mobile communication network 100.

The deployment of the solution according to the present invention has a limited impact on the LTE/LTE-A standard, since as described in detail in the foregoing an extensive and efficient reuse of channels and procedures already defined for the LTE/LTE-A systems is proposed.

Moreover, the embodiments of the present invention allow to easily performing lawful interception enforced by e.g. police forces also for D2D communications, since the D2D communication is controlled by the mobile communication network 100.

Nonetheless, thanks to the embodiments of the present invention it is possible to achieve an increment of the spectrum efficiency (i.e., deriving from a saving of downlink resources, from an increased spatial reuse of the uplink resources and from the dynamic allocation of radio resources dedicated to the D2D communication).

The invention claimed is:

1. A method of operating a mobile communication network comprising a plurality of radio base stations serving user equipment devices, the mobile communication network managing communications between user equipment devices, the method comprising:
   a) commanding, by a first radio base station of said plurality of radio base stations, a first user equipment device served by it to transmit a probe signal;
   b) providing, by the first radio base station and to a second user equipment device, device parameters for receiving the probe signal transmitted by the first user equipment device, the device parameters including at least a preamble index and a time/frequency slot index;
   c) measuring, by the first radio base station, the probe signal transmitted by the first user equipment device;
   d) receiving, by the first radio base station, a second measure of the probe signal transmitted by the first user equipment device, the second measure being performed by the second user equipment device;
   e) comparing, by the first radio base station, the first measure and the second measure, and
   f) commanding, by the first radio base station, a switch of a communication of the first user equipment device passing through radio base stations of the mobile communication network towards the second user equipment device to a direct device-to-device communication based on a result of said comparison.

2. The method of claim 1, wherein the first measure and the second measure of the probe signal are a measure of a strength of said probe signal, and wherein the first radio base station commands the switch of the communication of the first user equipment device towards the second user equipment device in case said compare reveals that such direct device-to-device communication of the first user equipment device towards the second user equipment device results in a reduction of transmit power for the first user equipment device compared to the communication passing through the radio base stations of the mobile communication network.

3. The method of claim 1, further comprising:
   g) commanding, by a second radio base station of said plurality of radio base stations serving the second user equipment device, the second user equipment device to transmit a probe signal;
   h) providing, by the second radio base station and to the first user equipment device, parameters for receiving the probe signal transmitted by the second user equipment device, the parameters provided by the second radio base station including at least a preamble index and a time/frequency slot index;
   i) performing, by the second radio base station, a third measure of the probe signal transmitted by the second user equipment device;
   j) receiving, by the second radio base station, a fourth measure of the probe signal transmitted by the second user equipment device, the fourth measure being performed by the first user equipment device;
   k) comparing, by the second radio base station, the third measure and the fourth measure, and
   l) commanding, by the second radio base station, a switch of a communication of the second user equipment device passing through the radio base stations of the mobile communication network towards the first user equipment device to a direct device-to-device communication based on a result of said compare.

4. The method of claim 3, wherein the third measure and the fourth measure of the probe signal are a measure of a strength of said probe signal, and wherein the second radio base station commands the switch of the communication of the second user equipment device towards the first user equipment device in case said compare reveals that such direct device-to-device communication of the second user equipment device towards the first user equipment device results in a reduction of transmit power for the second user equipment device compared to the communication passing through the radio base stations of the mobile communication network.

5. The method of claim 3, wherein said compare the first measure and the second measure comprises comparing a first ratio of the second measure over the first measure to a first threshold, and said compare the third measure and the fourth measure comprise comparing a second ratio of the fourth measure over the third measure to the first threshold, and:
   in case said first ratio exceeds said first threshold, having the first radio base station command the switch of the communication of the first user equipment device passing through the radio base stations of the mobile communication network towards the second user equipment device to the direct device-to-device communication;
   in case said second ratio exceeds said first threshold, having the second radio base station command the switch of the communication of the second user equipment device passing through the radio base stations of the mobile communication network towards the first user equipment device to a direct device-to-device communication.

6. The method of claim 3, further comprising, during said direct device-to-device communication:
   having the second base station command to the second user equipment device to send a first demodulation reference signal, to the first user equipment device over a physical uplink shared channel;
   having the first radio base station receive from the first user equipment device a first direct channel quality indicator, the first direct channel quality indicator being computed and sent by the first user equipment device based on the received first demodulation reference signal;

having the first base station command to the first user equipment device to send a second demodulation reference signal to the second user equipment device over the physical uplink shared channel, and having the second radio base station receive from the second user equipment device a second direct channel quality indicator, the second direct channel quality indicator being computed and sent by the second user equipment device based on the second demodulation reference signal.

7. The method of the claim 6, further comprising, during said direct device-to-device communication:

having the mobile communication network determine a first modulation and coding scheme, based on the first direct channel quality indicator for the sending data packets over a physical uplink data channel from the first user equipment device towards the second user equipment device;

having the mobile communication network provide said first modulation and coding scheme to the first user equipment device and to the second user equipment device;

having the mobile communication network determine a second modulation and coding scheme based on the second direct channel quality indicator for the sending data packets over the physical uplink data channel from the second user equipment device towards the first user equipment device, and having the mobile communication network provide said second modulation and coding scheme to the second user equipment device and to the first user equipment device.

8. The method of the claim 6, further comprising, during said direct device-to-device communication:

having the first radio base station send a first downlink reference signal, to the first user equipment device over a physical downlink control channel;

having the first radio base station command the first user equipment device to send the first direct channel quality indicator and a first cellular channel quality indicator alternately with a predetermined periodicity, the first cellular channel quality indicator being computed and sent by the first user equipment device on a basis of the first downlink reference signal, and having the second radio base station send a second downlink reference signal to the second user equipment device over the physical downlink control channel;

having the second radio base station command to the second user equipment device to send the second direct channel quality indicator and a second cellular channel quality indicator alternately with the predetermined periodicity, the second cellular channel quality indicator being computed and sent by the second user equipment device on a basis of the second downlink reference signal.

9. The method according to claim 8, further comprising, during said direct device-to-device communication:

having the mobile communication network compare the first direct channel quality indicator with the first cellular channel quality indicator, and in case said compare reveals that the first direct channel quality indicator is lower than the first cellular channel quality indicator:

having the mobile communication network trigger the transmission of a respective reference signal, by the first and by the second user equipment device;

having the mobile communication network measure the respective transmitted reference signals;

having the first radio base station command a switch of a direct device-to-device communication of the first user equipment device towards the second user equipment device to the communication passing through the radio base stations of the mobile communication network on a basis of said measurement;

having the mobile communication network compare the second direct channel quality indicator with the second cellular channel quality indicator, and in case said compare reveals that the first direct channel quality indicator is lower than the first cellular channel quality indicator:

having the mobile communication network trigger the transmission of a respective reference signal, by the first and by the second user equipment device;

having the mobile communication network measure the transmitted reference signals, and having the second radio base station command a switch of a direct device-to-device communication of the second user equipment device towards the first user equipment device to the communication passing through the radio base stations of the mobile communication network on a basis of said measurement.

10. The method of claim 3, further comprising, during said direct device-to-device communication, periodically reiterating steps g) to k), and having the second radio base station command a switch of a direct device-to-device communication of the second user equipment device towards the first user equipment device to the communication passing through the radio base stations of the mobile communication network in case said compare reveals that such direct device-to-device communication of the second user equipment device towards the first user equipment device requires higher transmit power for the second user equipment device than a communication passing through the radio base stations of the mobile communication network.

11. The method of claim 1, wherein commanding, by the first radio base station and to the first user equipment device served by it, the transmission of a probe signal and commanding, by a second radio base station serving the second user equipment device and to the second user equipment device, the transmission of the probe signal comprise:

commanding, by the first and second radio base stations, transmission to transmit to the first and second user equipment devices, respectively, said probe signal over a network physical random access channel of the mobile communication network, preferably the probe signal is a signal of request of access to the mobile communication network request signal.

12. The method of claim 1, comprising, during said direct device-to-device communication:

having the mobile communication network command to at least one between the first user equipment device and the second user equipment device to send data packets directly to the second or first user equipment device over a physical uplink shared channel.

13. The method of claim 12, further comprising, during said direct device-to-device communication:

having the first and the second radio base stations of the mobile communication network receive acknowledgements of successful/unsuccessful receipt messages sent from the first and the second user equipment devices, respectively, for data packets received directly from the second and the first user equipment devices, respectively, and having the mobile communication network forward the acknowledgements of successful/unsuccessful receipt messages to the second and to the first user equipment devices, respectively.

14. The method of claim 13, wherein:
said receive acknowledgements of successful/unsuccessful receipt messages comprises having the first and the second radio base stations receive the acknowledgements of successful/unsuccessful receipt messages over a physical uplink control channel, and
said having the mobile communication network forward the acknowledgements of successful/unsuccessful receipt messages comprises having the mobile communication network transmit the acknowledgements of successful/unsuccessful receipt messages over a receipts-dedicated downlink physical channel.

15. The method of claim 12, further comprising, during said direct device-to-device communication:
having the first radio base station send to the first user equipment device and forward to the second user equipment device a first downlink control information message, the first downlink control information message comprising a first indication of resources allocated to the first user equipment device for sending data packets over the physical uplink shared channel to the second user equipment device, and
having the second radio base station send to the second user equipment device and forward to the first user equipment device a second downlink control information message, the second downlink control information message comprising a second indication of resources allocated to the second user equipment device for sending data packets over the physical uplink shared channel to the first user equipment device.

16. The method of claim 15, wherein the first downlink control information message further comprises a first further indication of resources allocated to the first user equipment device for sending acknowledgements of successful/unsuccessful receipt messages and/or control packets over a physical uplink control channel to the first base station, and
wherein the second downlink control information message further comprises a second further indication of resources allocated to the second user equipment device for sending acknowledgements of successful/unsuccessful receipt messages and/or control packets over the physical uplink control channel to the second base station.

17. The method of claim 15, further comprising, during said direct device-to-device communication, having the mobile communication network exclude predetermined transmission intervals of a transmission time window from the resources allocated to the first and second user equipment devices for their transmissions over a data uplink physical channel and over the physical uplink control channel.

18. The method of claim 15, further comprising, during said direct device-to-device communication, having the mobile communication network allocate resources to the first and/or the second user equipment devices in predetermined transmission intervals of a transmission time window, said predetermined transmission intervals following a transmission interval in which the first and/or the second user equipment device received the first or the second downlink control information message, respectively.

19. The method of claim 15, wherein the first downlink control information message further comprises a first adjustment indication, the second downlink control information message further comprises a second adjustment indication, and
wherein the method further comprises:
having the first user equipment device adjust, according to said first adjustment indication, a first uplink transmission power used for sending the data packets and/or the acknowledgements of successful/unsuccessful receipt messages and the control packets, and
having the second user equipment device adjust, according to said second adjustment indication, a second uplink transmission power used for sending the data packets and/or the acknowledgements of successful/unsuccessful receipt messages and the control packets.

20. The method of claim 1, further comprising, during said direct device-to-device communication, periodically reiterating steps a) to e) of claim 1, and having the first radio base station command a switch of a direct device-to-device communication of the first user equipment device towards the second user equipment device to the communication passing through the radio base stations of the mobile communication network in case said compare reveals that such direct device-to-device communication of the first user equipment device towards the second user equipment device requires a higher transmit power for the first user equipment device compared to the communication passing through the radio base stations of the mobile communication network.

21. The method of claim 20, wherein said compare the first measure and the second measure comprises comparing a first ratio of the second measure to the first measure to a second threshold lower than said first threshold, and said compare the third measure and the fourth measure comprise comparing a second ratio of the fourth measure to the third measure to the second threshold, and:
in case said first ratio is lower than said second threshold, having the first radio base station command the switch of the direct device-to-device communication of the first user equipment device towards the second user equipment device to the communication passing through the radio base stations of the mobile communication network;
in case said second ratio is lower than said second threshold, having the second radio base station command the switch of the direct device-to-device communication of the second user equipment device towards the first user equipment device to the communication passing through the radio transceiver stations of the mobile communication network.

22. A method of operating a mobile communication network comprising a plurality of radio base stations serving user equipment devices, the mobile communication network managing communications between user equipment devices, the method comprising:
a) commanding, by a radio base station of said plurality of radio base stations and to a first user equipment device, a transmission of a probe signal;
b) providing, by the radio base station to a second user equipment device, parameters for receiving the probe signal transmitted by the first user equipment device, the device parameters including at least a preamble index and a time/frequency slot index;

c) measuring, by the radio base station, the probe signal transmitted by the first user equipment device;
d) receiving, by the radio base station, a second measure of the probe signal transmitted by the first user equipment device, the second measure being performed by the second user equipment device;
e) comparing, by the radio base station, the first measure and the second measure;
f) commanding, by the radio base station and to the second user equipment device, a transmission of a probe signal;
g) providing, by the radio base station and to the first user equipment device, parameters useful to the first user equipment device for receiving the probe signal transmitted by the second user equipment device;
h) performing, by the radio base station, a third measure of the probe signal transmitted by the second user equipment device;
i) receiving, by the radio base station, a fourth measure of the probe signal transmitted by the second user equipment device, the fourth measure being performed by the first user equipment device;
j) comparing, by the radio base station, the third measure and the fourth measure, and
k) based on results of said compare the first measure with the second measure and of said compare the third measure with the fourth measure:
  commanding, by the radio base station, a switch of a communication of the first user equipment device towards the second user equipment device and the communication of the second user equipment device towards the first user equipment device, from a communication passing through the radio base stations of the mobile communication network to a direct device-to-device communication or vice-versa, or
  commanding, by the radio base station, a switch of a communication of the first user equipment device towards the second user equipment device or a switch of the communication of the second user equipment device towards the first user equipment device from the communication passing through the radio base stations of the mobile communication network to the direct device-to-device communication or vice-versa, or
  maintaining, by the radio base station, a communication of the first user equipment device towards the second user equipment device and the communication of the second user equipment device towards the first user equipment device as the communication passing through the radio base stations of the mobile communication network, or as the direct device-to-device communication.

23. A mobile communication network configured to manage communications between user equipment devices, the mobile communication network comprising a plurality of radio base stations and being configured to implement the method of claim 1.

24. A method of operating a user equipment device configured to communicate over a mobile communication network which comprises a plurality of radio base stations for serving user equipment devices, the method comprising:
a) transmitting, by the user equipment device, a probe signal, in response to a command from a serving radio base station of said plurality of radio base stations that is serving the user equipment device;
b) receiving, by the user equipment device, parameters for receiving a probe signal transmitted by a further user equipment device, the parameters being provided by the serving radio base station, the parameters including at least a preamble index and a time/frequency slot index;
c) performing, by the user equipment device, a measure of a probe signal transmitted by the further user equipment device;
d) providing, by the user equipment device and to the serving radio base station, the measure of the probe signal transmitted by the further user equipment device, wherein the serving radio base performs its own measurement of the probe signal, and
e) switching, by the user equipment device, a communication towards the further user equipment device or/and from the further user equipment device to a direct device-to-device communication in response to a command from the serving radio base station, or
f) switching, by the user equipment device, a communication towards the further user equipment device to a communication passing through the radio base stations of the mobile communication network in response to a command from the radio base station.

25. The method of claim 24, wherein the measure of the probe signal is a measure of a strength of said probe signal.

26. The method of claim 24, comprising, during said direct device-to-device communication:
having the user equipment device send data packets directly to the further user equipment device over a physical uplink shared channel.

27. The method of claim 26, further comprising, during said direct device-to-device communication:
having the user equipment device send acknowledgements of successful/unsuccessful receipt messages, for data packets received directly from the further user equipment device, to the serving radio base station of the mobile communication network, and
having the user equipment device receive the acknowledgements of successful/unsuccessful receipt messages forwarded by the mobile communication network for data packets sent from the user equipment device to the further user equipment device.

28. The method of claim 27, wherein:
said send acknowledgements of successful/unsuccessful receipt messages comprises having the user equipment device transmit the acknowledgements of successful/unsuccessful receipt messages to the mobile communication network over a physical uplink control channel, and
said having the user equipment device receive the acknowledgements of successful/unsuccessful receipt messages comprises having the user equipment device receive the acknowledgements of successful/unsuccessful receipt messages over a receipts-dedicated downlink physical channel.

29. The method of claim 26, wherein said send acknowledgements of successful/unsuccessful receipt messages further comprises having the user equipment device transmit the acknowledgements of successful/unsuccessful receipt messages to the further user equipment device, over a data uplink physical channel (PUSCH).

30. The method of claim 26, further comprising, during said direct device-to-device communication:
having the user equipment device receive a demodulation reference signal, from the further user equipment device over a physical uplink shared channel;

having the user equipment device determine a direct channel quality indicator based on the received demodulation reference signal;

having the user equipment device send the direct channel quality indicator to the serving radio base station.

31. The method according to claim 30, further comprising, during said direct device-to-device communication:

having the user equipment device receive from the serving radio base station a downlink reference signal, over a physical downlink control channel;

having the user equipment device determine a cellular channel quality indicator based on the received downlink reference signal, and having the user equipment device send to the serving radio base station the direct channel quality indicator and the cellular channel quality indicator alternately with a predetermined periodicity.

32. A mobile communication device capable of performing direct device-to-device communication with at least a further user equipment device, the mobile communication device being configured to implement the method of claim 24.

33. The mobile communication device of claim 32, comprising an uplink transmitter having a first combining element and a second combining element, the first combining element being configured to combine control information with a first power scaling factor and the second combining element being configured to combine data information of the direct device-to-device communication with a second power scaling factor, respectively.

* * * * *